(12) United States Patent
Pettersen et al.

(10) Patent No.: US 10,623,703 B2
(45) Date of Patent: Apr. 14, 2020

(54) CCTV SYSTEM

(71) Applicant: Schlumberger Technology Corporation, Sugar Land, TX (US)

(72) Inventors: Espen Pettersen, Kristiansand (NO); Anstein Jorud, Kristiansand (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/908,396

(22) Filed: Feb. 28, 2018

(65) Prior Publication Data

US 2019/0268571 A1  Aug. 29, 2019

(51) Int. Cl.
  *H04N 7/18* (2006.01)
  *G08B 13/196* (2006.01)
  *H04N 5/232* (2006.01)
  *H04N 21/218* (2011.01)

(52) U.S. Cl.
  CPC ....... *H04N 7/181* (2013.01); *G08B 13/19689* (2013.01); *H04N 5/232* (2013.01); *H04N 21/21805* (2013.01)

(58) Field of Classification Search
  None
  See application file for complete search history.

(56) References Cited

U.S. PATENT DOCUMENTS

| | | |
|---|---|---|
| 4,610,005 A | 9/1986 | Utasi |
| 6,629,572 B2 | 10/2003 | Womer et al. |
| 7,584,796 B2 | 9/2009 | Ayling |
| 8,215,417 B2 | 7/2012 | Annaiyappa et al. |
| 8,392,552 B2* | 3/2013 | Alexander .......... H04L 41/0893 340/506 |
| 9,464,492 B2 | 10/2016 | Austefjord et al. |
| 10,012,068 B2 | 7/2018 | OReilly |
| 10,246,952 B2 | 4/2019 | Trydal et al. |
| 2002/0060093 A1 | 5/2002 | Womer et al. |
| 2004/0212679 A1* | 10/2004 | Jun .................. G08B 13/19693 348/159 |
| 2005/0109537 A1* | 5/2005 | Ayling .................... E21B 7/124 175/5 |
| 2007/0119622 A1 | 5/2007 | Ayling |
| 2008/0173480 A1 | 7/2008 | Annaiyappa et al. |
| 2008/0239412 A1* | 10/2008 | Kobayashi ......... H04N 1/00933 358/475 |
| 2010/0147510 A1* | 6/2010 | Kwok .................... G01V 11/00 166/250.01 |
| 2012/0243945 A1 | 9/2012 | Swingler et al. |
| 2013/0345878 A1 | 12/2013 | Austefjord et al. |
| 2014/0085463 A1* | 3/2014 | Kwon ..................... G06T 11/00 348/143 |
| 2014/0348385 A1 | 11/2014 | Kozicz et al. |

(Continued)

*Primary Examiner* — Talha M Nawaz
(74) *Attorney, Agent, or Firm* — Rachel E. Greene

(57) ABSTRACT

A closed-circuit television (CCTV) system for use at a well construction system to form a well at an oil/gas wellsite. The CCTV system includes a video output device and video cameras at the well construction system. A control system is communicatively connected with each video camera and the video output device. The control system receives video display settings from a human wellsite operator, receives the video signals from the video cameras, and automatically displays on the video output device one or more of the received video signals based on the video display settings.

10 Claims, 8 Drawing Sheets

(56) References Cited

U.S. PATENT DOCUMENTS

| | | | |
|---|---|---|---|
| 2015/0145991 A1* | 5/2015 | Russell | H04N 7/181 |
| | | | 348/143 |
| 2015/0363738 A1 | 12/2015 | Haci | |
| 2016/0160631 A1 | 6/2016 | Oreilly | |
| 2016/0292513 A1 | 10/2016 | Kozicz et al. | |
| 2016/0358435 A1* | 12/2016 | Lee | G08B 13/1963 |
| 2017/0037691 A1* | 2/2017 | Savage | E21B 47/12 |
| 2017/0061791 A1* | 3/2017 | Cherewka | G08G 1/0955 |
| 2017/0064256 A1 | 3/2017 | Richardson et al. | |
| 2017/0182406 A1 | 6/2017 | Castiglia et al. | |
| 2017/0193693 A1* | 7/2017 | Robert | G06T 7/55 |
| 2017/0306710 A1 | 10/2017 | Trydal et al. | |
| 2017/0374437 A1 | 12/2017 | Schwarzkopf et al. | |
| 2018/0012125 A1 | 1/2018 | Ladha et al. | |
| 2019/0016418 A1 | 1/2019 | Vandenworm | |
| 2019/0078426 A1* | 3/2019 | Zheng | E21B 33/06 |

\* cited by examiner

CCTV SYSTEM

BACKGROUND OF THE DISCLOSURE

Wells are generally drilled into the ground or ocean bed to recover natural deposits of oil, gas, and other materials that are trapped in subterranean formations. The wells are drilled into the subterranean formations using a drill bit attached to a lower end of a drill string. The well construction utilizes various wellsite equipment operating in a coordinated manner. The wellsite equipment can be grouped into subsystems, and each subsystem may perform different operations controlled by a corresponding controller.

One such example is a closed circuit television (CCTV) system. The CCTV system provides a display of wellsite equipment so that a human operator can view the well construction progress. The operator manually controls the CCTV system, such as by selecting video camera feeds to monitor different well construction equipment and operations, and perhaps adjusting camera settings for different environmental conditions at the wellsite.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a closed-circuit television (CCTV) system for use at a well construction system to form a well at an oil/gas wellsite. The CCTV system includes video cameras at different locations within the well construction system. Each video camera generates a corresponding video signal. The CCTV system also includes a video output device. The apparatus also includes a control system communicatively connected with each video camera and the video output device. The control system includes a processor and a memory operable to store computer programs that utilize video display settings. The control system receives the video display settings from a human wellsite operator, receives the video signals from the video cameras, and automatically displays one or more of the received video signals on the video output device based on the video display settings.

The present disclosure also introduces an apparatus including a well construction system that includes components collectively operable to construct a well at an oil/gas wellsite via multiple operations, video cameras at different locations in the well construction system and generating corresponding video signals, a video output device, and a control system having a processor and a memory storing an executable code. The control system receives the video signals and video display settings that include associations between the operations and the video cameras. During each operation, one or more of the video signals received from the one or more video cameras associated with that operation are automatically displayed on the video output device.

The present disclosure also introduces a method including constructing a well at an oil/gas wellsite by operating a well construction system to perform a plurality of operations, and by operating a control system having a processor and a memory storing an executable code. The control system receives video signals from video cameras each positioned at a different location in the well construction system. The control system also receives video display settings including associations between the operations and the video cameras. During each operation, a video output device automatically displays one or more of the video signals received from the one or more video cameras associated with that operation.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
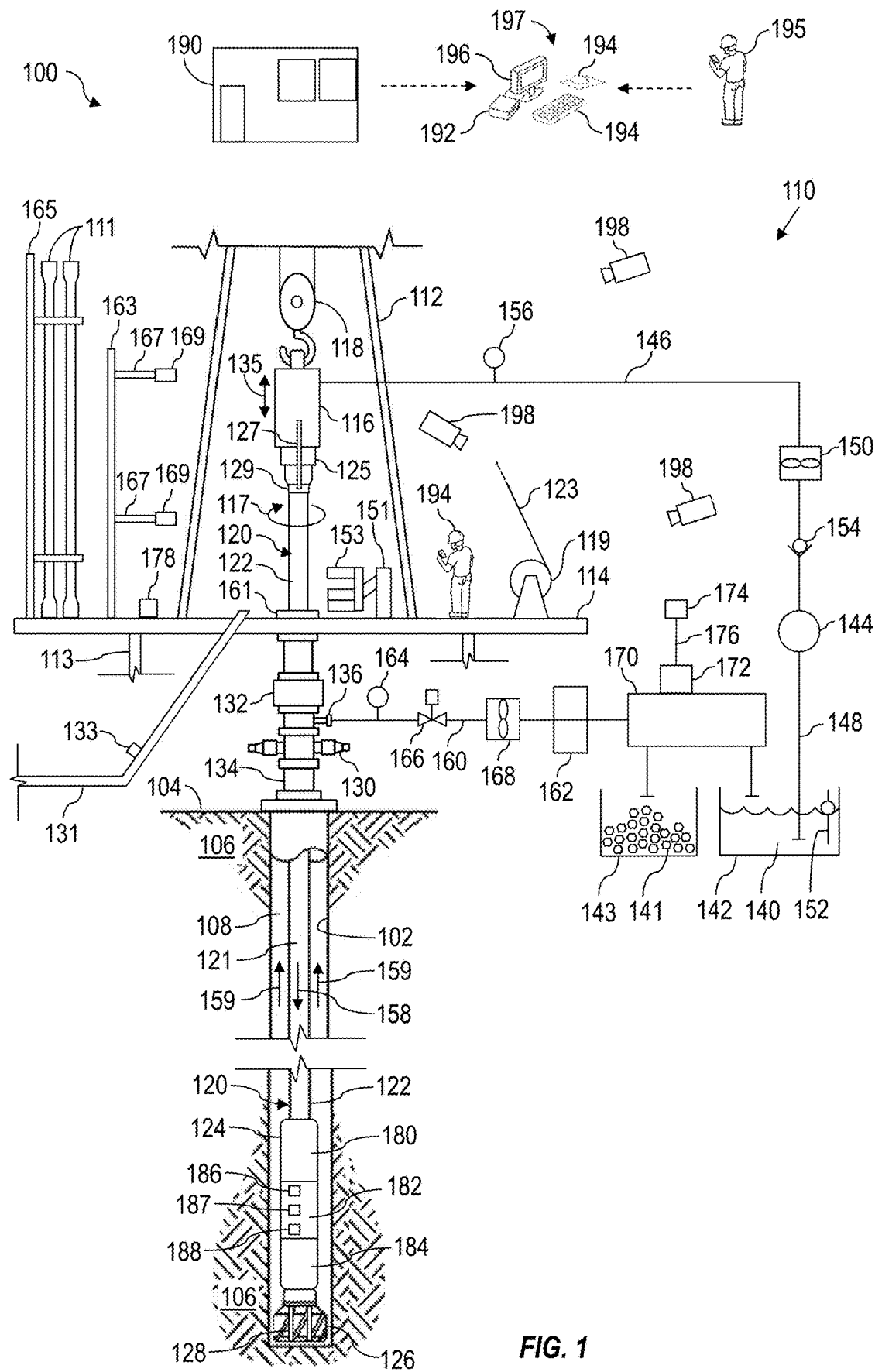
FIG. 1 is a schematic view of at least a portion of an example implementation of apparatus according to one or more aspects of the present disclosure.

It is to be understood that the following disclosure describes many example implementations for different aspects introduced herein. Specific examples of components and arrangements are described below to simplify the present disclosure. These are merely examples, and are not intended to be limiting. In addition, the present disclosure may repeat reference numerals and/or letters in the various examples. This repetition is for simplicity and clarity, and does not in itself dictate a relationship between the various implementations described herein. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

FIG. 1 is a schematic view of at least a portion of an example implementation of a well construction system 100 according to one or more aspects of the present disclosure. The well construction system 100 represents an example environment in which one or more aspects described below may be implemented. Although the well construction system 100 is depicted as an onshore implementation, the aspects described below are also applicable to offshore and inshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another wellsite structure 112 disposed over a rig floor 114. The drill string 120 may be suspended within the wellbore 102 from the wellsite structure 112. The wellsite structure 112 and the rig floor 114 are collectively supported over the wellbore 102 by legs and/or other support structures 113.

The drill string 120 may comprise a bottom-hole assembly (BHA) 124 and means 122 for conveying the BHA 124 within the wellbore 102. The conveyance means 122 may comprise drill pipe, heavy-weight drill pipe (HWDP), wired drill pipe (WDP), tough logging condition (TLC) pipe, coiled tubing, and/or other means for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor (not shown) connected with the drill bit 126.

The BHA 124 may also include various downhole tools 180, 182, 184. One or more of such downhole tools 180, 182, 184 may be or comprise an acoustic tool, a density tool, a directional drilling tool, an electromagnetic (EM) tool, a formation sampling tool, a formation testing tool, a gravity tool, a monitoring tool, a neutron tool, a nuclear tool, a photoelectric factor tool, a porosity tool, a reservoir characterization tool, a resistivity tool, a sampling while drilling (SWD) tool, a seismic tool, a surveying tool, and/or other measuring-while-drilling (MWD) or logging-while-drilling (LWD) tools.

One or more of the downhole tools 180, 182, 184 may be or comprise an MWD or LWD tool comprising a sensor package 186 operable for the acquisition of measurement data pertaining to the BHA 124, the wellbore 102, and/or the formation 106. One or more of the downhole tools 180, 182, 184 and/or another portion of the BHA 124 may also comprise a telemetry device 187 operable for communication with the surface equipment, such as via mud-pulse telemetry. One or more of the downhole tools 180, 182, 184 and/or another portion of the BHA 124 may also comprise a downhole processing device 188 operable to receive, process, and/or store information received from the surface equipment, the sensor package 186, and/or other portions of the BHA 124. The processing device 188 may also store executable programs and/or instructions, including for implementing one or more aspects of the operations described herein.

The wellsite structure 112 may support a top drive 116 operable to connect (perhaps indirectly) with an uphole end of the conveyance means 122, and to impart rotary motion 117 and axial motion 135 to the drill string 120 and the drill bit 126. However, a kelly and rotary table (neither shown) may be utilized instead of or in addition to the top drive 116 to impart the rotary motion 117. The top drive 116 and the connected drill string 120 may be suspended from the wellsite structure 112 via hoisting equipment, which may include a traveling block 118, a crown block (not shown), and a drawworks 119 storing a support cable or line 123. The crown block may be connected to or otherwise supported by the wellsite structure 112, and the traveling block 118 may be coupled with the top drive 116, such as via a hook. The drawworks 119 may be mounted on or otherwise supported by the rig floor 114. The crown block and traveling block 118 comprise pulleys or sheaves around which the support line 123 is reeved to operatively connect the crown block, the traveling block 118, and the drawworks 119 (and perhaps an anchor). The drawworks 119 may thus selectively impart tension to the support line 123 to lift and lower the top drive 116. The drawworks 119 may comprise a drum, a frame, and a prime mover (e.g., an engine or motor) (not shown) operable to drive the drum to rotate and reel in the support line 123, causing the traveling block 118 and the top drive 116 to move upward. The drawworks 119 may be operable to release the support line 123 via a controlled rotation of the drum, causing the traveling block 118 and the top drive 116 to move downward.

The top drive 116 may include a grabber, a swivel (neither shown), a tubular handling assembly 127 terminating with an elevator 129, and a drive shaft 125 operatively connected with a prime mover (not shown). The drill string 120 may be mechanically coupled to the top drive shaft 125 with or without a sub saver between the drill string 120 and the top drive shaft 125. The prime mover may drive the top drive shaft 125, such as through a gear box or transmission (not shown), to rotate the top drive shaft 125 and, therefore, the drill string 120, which in conjunction with operation of the drawworks 119 may advance the drill string 120 into the formation 106 and form the wellbore 102. The tubular handling assembly 127 and the elevator 129 may permit the top drive 116 to handle tubulars (e.g., drill pipes, drill collars, casing joints, and the like, that are not mechanically coupled to the drive shaft 125). For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the top drive shaft 125. The top drive 116 may have a guide system (not shown), such as rollers that track up and down a guide rail (not shown) on the wellsite structure 112. The guide system may aid in keeping the top drive 116 aligned with the wellbore 102, and in preventing the top drive 116 from rotating during drilling by transferring reactive torque to the wellsite structure 112.

The drill string 120 may be conveyed within the wellbore 102 through a plurality of well control devices disposed at the wellsite surface 104 on top of the wellbore 102 and below the rig floor 114. The well control devices may be operable to control pressure within the wellbore 102 via a series of pressure barriers formed between the wellbore 102 and the wellsite surface 104. The well control devices may include a blowout preventer (BOP) stack 130 and an annular fluid control device 132, such as an annular preventer and/or a rotating control device (RCD). The well control devices may be mounted on top of a wellhead 134.

The well construction system 100 may include a drilling fluid circulation system operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding drilling fluid 140, and a pump 144 operable to move the drilling fluid 140 from the container 142 into the fluid passage 121 of the drill string 120 via a fluid conduit 146 extending from the pump 144 to the top drive 116 and an internal passage extending through the top drive 116. The fluid conduit 146 may comprise one or more of a pump discharge line, a stand pipe, a rotary hose, and a gooseneck (not shown) connected with a fluid inlet of the top drive 116. The pump 144 and the container 142 may be fluidly connected by a fluid conduit 148.

A flow rate sensor 150 may be operatively connected along the fluid conduit 146 to measure flow rate of the drilling fluid 140 being pumped downhole. The flow rate sensor 150 may be operable to measure volumetric and/or mass flow rate of the drilling fluid 140. The flow rate sensor 150 may be an electrical flow rate sensor operable to generate an electrical signal and/or information indicative of the measured flow rate. The flow rate sensor 150 may be a Coriolis flowmeter, a turbine flowmeter, or an acoustic flowmeter, among other examples.

A fluid level sensor 152 may be mounted or otherwise disposed in association with the container 142, and may be operable to measure the level of the drilling fluid 140 within the container 142. The fluid level sensor 152 may be an electrical fluid level sensor operable to generate signals or information indicative of the amount (e.g., level, volume) of drilling fluid 140 within the container 142. The fluid level sensor 152 may comprise conductive, capacitive, vibrating, electromechanical, ultrasonic, microwave, nucleonic, and/or other example sensors. A flow check valve 154 may be connected downstream from the pump 144 to prevent the drilling or other fluids from backing up through the pump 144.

A pressure sensor 156 may be connected along the fluid conduit 146, such as to measure the pressure of the drilling fluid 140 being pumped downhole. The pressure sensor 156 may be connected close to the top drive 116, such as may permit the pressure sensor 156 to measure the pressure within the drill string 120 at the top of the internal passage 121 or otherwise proximate the wellsite surface 104. The pressure sensor 156 may be an electrical sensor operable to generate electric signals and/or other information indicative of the measured pressure.

During drilling operations, the drilling fluid may continue to flow downhole through the internal passage 121 of the drill string 120, as indicated in FIG. 1 by directional arrow 158. The drilling fluid may exit the BHA 124 via ports 128 in the drill bit 126 and then circulate uphole through an annular space ("annulus") 108 of the wellbore 102 defined between an exterior of the drill string 120 and the wall of the wellbore 102, such flow being indicated in FIG. 1 by directional arrows 159. In this manner, the drilling fluid 140 lubricates the drill bit 126 and carries formation cuttings uphole to the wellsite surface 104. The returning drilling fluid may exit the annulus 108 via a wing valve, a bell nipple, or another ported adapter 136. The ported adapter 136 may be disposed below the annular fluid control device 132, above the BOP stack 130, or at another location along the well control devices permitting ported access or fluid connection with the annulus 108.

The drilling fluid exiting the annulus 108 via the ported adapter 136 may be directed into a fluid conduit 160, and may pass through various equipment fluidly connected along the conduit 160 prior to being returned to the container 142 for recirculation. For example, the drilling fluid may pass through a choke manifold 162 connected along the conduit 160. The choke manifold 162 may include at least one choke and a plurality of fluid valves (neither shown) collectively operable to control the flow from the choke manifold 162. Backpressure may be applied to the annulus 108 by variably restricting flow of the drilling fluid or other fluids flowing through the choke manifold 162. The greater the restriction to flow through the choke manifold 162, the greater the backpressure applied to the annulus 108. Thus, downhole pressure (e.g., pressure at the bottom of the wellbore 102 around the BHA 124 or at a particular depth along the wellbore 102) may be regulated by varying the backpressure at an upper (i.e., uphole) end (e.g., within an upper portion) of the annulus 108 proximate the wellsite surface 104. Pressure maintained at the upper end of the annulus 108 may be measured via a pressure sensor 164 connected along the conduit 160 between the ported adapter 136 and the choke manifold 162. A fluid valve 166 may be connected along the conduit 160 to selectively fluidly isolate the annulus 108 from the choke manifold 162 and/or other surface equipment 110 fluidly connected with the conduit 160. The fluid valve 166 may be or comprise fluid shut-off valves, such as ball valves, globe valves, and/or other types of fluid valves, which may be selectively opened and closed to permit and prevent fluid flow therethrough. The fluid valve 166 may be actuated remotely by a corresponding actuator operatively coupled with the fluid valve 166. The actuator may be or comprise an electric actuator, such as a solenoid or motor, or a fluid actuator, such as pneumatic or hydraulic cylinder or rotary actuator. The fluid valve 166 may also or instead be actuated manually, such as by a corresponding lever. A flow rate sensor 168 may be connected along the fluid conduit 160 to monitor the flow rate of the returning drilling fluid or another fluid being discharged from the wellbore 102.

Before being returned to the container 142, the drilling fluid may be cleaned and/or reconditioned by solids and gas control equipment 170, which may include one or more of shakers, separators, centrifuges, and other drilling fluid cleaning devices. The solids control equipment 170 may be operable for separating and removing solid particles 141 (e.g., drill cuttings) from the drilling fluid returning to the surface 104. The solids and gas control equipment 170 may also comprise fluid reconditioning equipment, such as may remove gas and/or finer formation cuttings 143 from the drilling fluid. The fluid reconditioning equipment may include a desilter, a desander, a degasser 172, and/or the like. The degasser 172 may form or be mounted in association with one or more portions of the solids and gas control equipment 170. The degasser 172 may be operable for releasing and/or capturing formation gasses entrained in the drilling fluid discharged from the wellbore 102. Intermediate tanks/containers (not shown) may be utilized to hold the drilling fluid 140 between the various portions of the solids and gas control equipment 170.

The degasser 172 may be fluidly connected with one or more gas sensors 174 (e.g., gas detectors and/or analyzers) via a fluid conduit 176, such as may permit the formation gasses released and/or captured by the degasser 172 to be directed to and analyzed by the gas sensors 174. The gas sensors 174 may be operable for generating signals or information indicative of the presence and/or quantity of formation gasses released and/or captured by the degasser 172. The gas sensors 174 may be or comprise qualitative gas analyzers, which may be utilized for safety purposes, such as to detect presence of hazardous gases entrained within the drilling fluid. The gas sensors 174 may also or instead be or comprise quantitative gas analyzers, which may be utilized to detect levels or quantities of certain formation gasses, such as to perform formation evaluation. One or more gas sensors 178 (e.g., qualitative gas analyzers) may also or instead be located at the rig floor 114, such as to detect hazardous gasses being released from the wellbore 102.

The cleaned/reconditioned drilling fluid may be transferred to the fluid container 142, and the solid particles 141 removed from the fluid may be transferred to a solids container 143 (e.g., a reserve pit). The container 142 may include an agitator (not shown) to maintain uniformity of the drilling fluid 140 therein. A hopper (not shown), such as may be disposed in a flowline between the container 142 and the pump 144, may be utilized to introduce chemical additives, such as caustic soda, into the drilling fluid 140.

The surface equipment 110 may include tubular handling equipment operable to store, move, connect, and disconnect tubulars to assemble and disassemble the conveyance means 122 of the drill string 120 during drilling operations. For example, a catwalk 131 may be utilized to convey tubulars from a ground level, such as along the wellsite surface 104, to the rig floor 114, permitting the tubular handling assembly 127 to grab and lift the tubulars above the wellbore 102 for connection with previously deployed tubulars. The catwalk 131 may have a horizontal portion and an inclined portion that extends between the horizontal portion and the rig floor 114. The catwalk 131 may comprise a skate 133 movable along a groove (not shown) extending longitudinally along the horizontal and inclined portions of the catwalk 131. The skate 133 may be operable to convey (e.g., push) the tubulars along the catwalk 131 to the rig floor 114. The skate 133 may be driven along the groove by a drive system (not shown), such as a pulley system or a hydraulic system, among other examples. Additionally, one or more racks (not shown) may adjoin the horizontal portion of the catwalk 131. The racks may have a spinner unit (not shown) for transferring tubulars to the groove of the catwalk 131.

An iron roughneck 151 may be positioned on the rig floor 114. The iron roughneck 151 may comprise a torqueing portion 153, such as may include a spinner and a torque wrench comprising a lower tong and an upper tong. The torqueing portion 153 of the iron roughneck 151 may be moveable toward and at least partially around the drill string 120, such as may permit the iron roughneck 151 to make up and break out connections of the drill string 120. The torqueing portion 153 may also be moveable away from the drill string 120, such as may permit the iron roughneck 151 to move clear of the drill string 120 during drilling operations. The spinner of the iron roughneck 151 may be utilized to apply low torque to make up and break out threaded connections between tubulars of the drill string 120, and the torque wrench may be utilized to apply a higher torque to tighten and loosen the threaded connections.

A reciprocating slip 161 may be located on the rig floor 114, such as may accommodate therethrough the conveyance means 122 during make up and break out operations and during the drilling operations. The reciprocating slip 161 may be in an open position during drilling operations to permit advancement of the drill string 120 therethrough, and in a closed position to clamp an upper end of the conveyance means 122 (e.g., assembled tubulars) to thereby suspend and prevent advancement of the drill string 120 within the wellbore 102, such as during the make up and break out operations.

During drilling operations, the hoisting equipment lowers the drill string 120 while the top drive 116 rotates the drill string 120 to advance the drill string 120 downward within the wellbore 102 and into the formation 106. During the advancement of the drill string 120, the reciprocating slip 161 is in an open position, and the iron roughneck 151 is moved away or is otherwise clear of the drill string 120. When the upper portion of the tubular in the drill string 120 that is made up to the top drive shaft 125 is near the reciprocating slip 161 and/or the rig floor 114, the top drive 116 ceases rotating and the reciprocating slip 161 closes to clamp the tubular made up to the top drive shaft 125. The grabber of the top drive 116 then clamps the upper portion of the tubular made up to the top drive shaft 125, and the top drive shaft 125 rotates in a direction reverse from the drilling rotation to break out the connection between the drive shaft 125 and the made up tubular. The grabber of the top drive 116 may then release the tubular of the drill string 120.

Multiple tubulars may be loaded on the rack of the catwalk 131 and individual tubulars (or stands of two or three tubulars) may be transferred from the rack to the groove in the catwalk 131, such as by the spinner unit. The tubular positioned in the groove may be conveyed along the groove by the skate 133 until an end of the tubular projects above the rig floor 114. The elevator 129 of the top drive 116 then grasps the protruding end, and the drawworks 119 is operated to lift the top drive 116, the elevator 129, and the new tubular.

The hoisting equipment then raises the top drive 116, the elevator 129, and the tubular until the tubular is aligned with the upper portion of the drill string 120 clamped in the slip 161. The iron roughneck 151 is moved toward the drill string 120, and the lower tong of the torqueing portion 153 clamps onto the upper portion of the drill string 120. The spinning system rotates the new tubular (e.g., a threaded male end) into the upper portion of the drill string 120 (e.g., a threaded female end). The upper tong then clamps onto the new tubular and rotates with high torque to complete making up the connection with the drill string 120. In this manner, the new tubular becomes part of the drill string 120. The iron roughneck 151 then releases and moves clear of the drill string 120.

The grabber of the top drive 116 may then clamp onto the drill string 120. The top drive shaft 125 (e.g., a threaded male end) is brought into contact with the drill string 120 (e.g., a threaded female end) and rotated to make up a connection between the drill string 120 and the top drive shaft 125. The grabber then releases the drill string 120, and the reciprocating slip 161 is moved to the open position. Drilling operations may then resume.

The tubular handling equipment may further include a tubular handling manipulator (PHM) 163 disposed in association with a fingerboard 165. Although the PHM 163 and the fingerboard 165 are shown supported on the rig floor 114, one or both of the PHM 163 and fingerboard 165 may be located on the wellsite surface 104 or another area of the well construction system 100. The fingerboard 165 provides storage (e.g., temporary storage) of tubulars (or stands of two or three tubulars) 111 during various operations, such as during and between tripping out and tripping in the drill string 120. The PHM 163 may be operable to transfer the tubulars 111 between the fingerboard 165 and the drill string 120 (i.e., space above the suspended drill string 120). For example, the PHM 163 may include arms 167 terminating with clamps 169, such as may be operable to grasp and/or clamp onto one of the tubulars 111. The arms 167 of the PHM 163 may extend and retract, and/or at least a portion of the PHM 163 may be rotatable and/or movable toward and away from the drill string 120, such as may permit the PHM 163 to transfer the tubular 111 between the fingerboard 165 and the drill string 120.

To trip out the drill string 120, the top drive 116 is raised, the reciprocating slip 161 is closed around the drill string 120, and the elevator 129 is closed around the drill string 120. The grabber of the top drive 116 clamps the upper portion of the tubular made up to the top drive shaft 125. The top drive shaft 125 then rotates in a direction reverse from the drilling rotation to break out the connection between the top drive shaft 125 and the drill string 120. The grabber of the top drive 116 then releases the tubular of the drill string 120, and the drill string 120 is suspended by (at least in part) the elevator 129. The iron roughneck 151 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The iron roughneck 151 then releases the drill string 120 and moves clear of the drill string 120.

The PHM 163 may then move toward the tool string 120 to grasp the tubular suspended from the elevator 129. The elevator 129 then opens to release the tubular. The PHM 163 then moves away from the tool string 120 while grasping the tubular with the clamps 169, places the tubular in the fingerboard 165, and releases the tubular for storage in the fingerboard 165. This process is repeated until the intended length of drill string 120 is removed from the wellbore 102.

The surface equipment 110 of the well construction system 100 may also comprise a control center 190 (e.g., a cabin, a trailer, a facility, etc.) from which various portions of the well construction system 100, such as the hoisting system, the tubular handling system, the drilling fluid circulation system, the well control devices, and the BHA 124, among other examples, may be monitored and controlled. The control center 190 may be located on the rig floor 114 or another location of the well construction system 100, such as the wellsite surface 104. The control center 190 may contain or comprise a processing device 192 (e.g., a controller, a control system, a computer, etc.) operable to provide control of one or more portions of the well construction system 100 and/or operable to monitor operations of one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable programs, instructions, and/or operational parameters or set-points, including for implementing one or more aspects of the operations described herein. The processing device 192 may be communicatively connected with a human operator control workstation 197 from which various wellsite equipment or portions of the well construction system 100 may be monitored and controlled. The operator workstation 197 may be operable for entering or otherwise communicating commands to the processing device 192 by a human wellsite operator 195, and for displaying or otherwise communicating information from the processing device 192 to the wellsite operator 195. The operator workstation 197 may comprise a plurality of human-machine interface (HMI) devices, including one or more input devices 194 (e.g., a keyboard, a mouse, a joystick, a touchpad, etc.) and one or more output devices 196 (e.g., a video monitor, a printer, audio speakers, etc.). The control center 190 may contain or comprise the operator workstation 197. Communication between the control center 190, the processing device 192, the input and output devices 194, 196 of the operator workstation 197, and the various wellsite equipment may be via wired and/or wireless communication means. However, for clarity and ease of understanding, such communication means are not depicted, and a person having ordinary skill in the art will appreciate that such communication means are within the scope of the present disclosure.

The well construction system 100 also includes stationary and/or mobile video cameras 198 disposed or utilized at various locations within the well construction system 100. The video cameras 198 capture videos of various components, portions, or subsystems of the well construction system 100, and perhaps wellsite operators (humans) 195 and the actions they perform, during or otherwise in association with the wellsite operations, including while performing repairs to the well construction system 100 during a breakdown. For example, the video cameras 198 may capture videos of the entire well construction system 100 and/or specific portions of the well construction system 100, such as the top drive 116, the iron roughneck 151, the PHM 163, the fingerboard 165, and/or the catwalk 131, among other examples. The video cameras 198 generate corresponding video signals comprising or otherwise indicative of the captured videos. The video cameras 198 may be in signal communication with the control center 190, such as may permit the video signals to be transmitted to the processing device 192 and, thus, permit the wellsite operators 195 to view various portions or components of the well construction system 100 on one or more of the output devices 196. The processing device 192 or another portion of the control center 190 may be operable to record the video signals generated by the video cameras 198.

Well construction systems within the scope of the present disclosure may include more or fewer components than as described above and depicted in FIG. 1. Additionally, various components and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Figure 2:
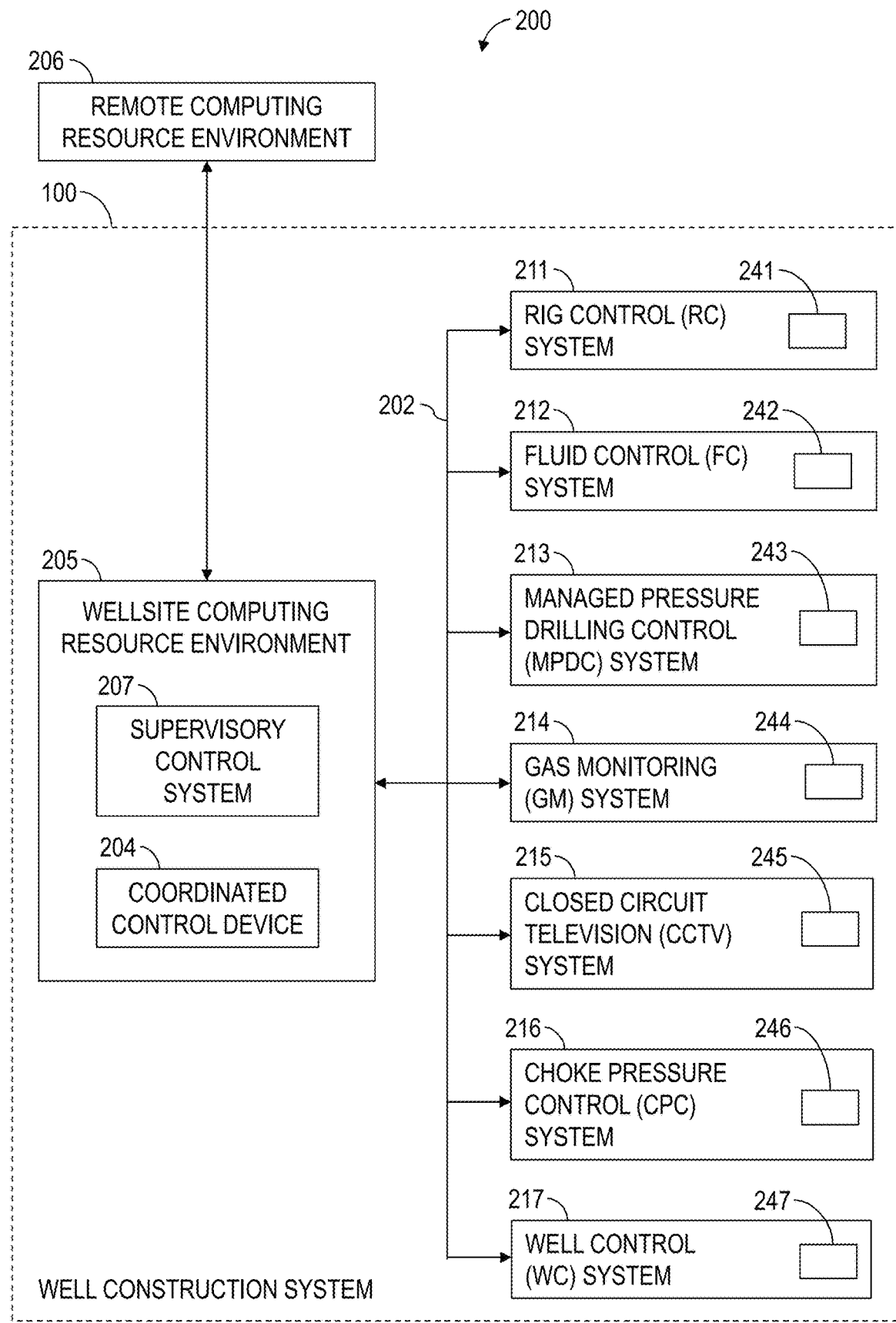
FIG. 2 is a schematic view of at least a portion of an example implementation of apparatus according to one or more aspects of the present disclosure.

FIG. 2 is a schematic view of at least a portion of an example implementation of a control system 200 for the well construction system 100 according to one or more aspects of the present disclosure. The following description refers to FIGS. 1 and 2 collectively.

The control system 200 may include a wellsite computing resource environment 205, which may be located at the wellsite 104 as part of the well construction system 100. The wellsite computing resource environment 205 may include a coordinated control device 204 and/or a supervisory control system 207. The control system 200 may further include a remote computing resource environment 206, which may be located offsite (i.e., not at the wellsite 104). The remote computing resource environment 206 may be communicatively connected with the wellsite computing resource environment 206 via a communication network. A "cloud" computing environment is one example of a remote computing resource. The cloud computing environment may communicate with the wellsite computing resource environment 205 via a network connection, such as via a wide-area-network (WAN), a local-area-network (LAN), and/or other networks also within the scope of the present disclosure. The wellsite computing resource environment 205 may be or comprise at least a portion of the control center 190 and/or the processing device 192 described above.

As described above, the well construction system 100 may include various subsystems with different actuators and sensors for performing operations of the well construction system 100, and these may be monitored and controlled via the wellsite computing resource environment 205, the remote computing resource environment 206, and/or local controllers 241-247 (e.g., control systems) of the corresponding subsystems. The wellsite computing resource environment 205 may also provide for secured access to well construction system data, such as to facilitate onsite and offsite user devices monitoring the well construction system 100, to send control processes to the well construction system 100, and the like.

The various subsystems of the well construction system 100 may include a rig control (RC) system 211, a fluid control (FC) system 212, a managed pressure drilling control (MPDC) system 213, a gas monitoring (GM) system 214, a CCTV system 215, a choke pressure control (CPC) system 216, and a well control (WC) system 217. These subsystems 211-217 may include one or more of the components described above with respect to the well construction system 100, such as described in the examples below.

The RC system 211 may include the wellsite structure 112, the hoisting equipment (e.g., the drawworks 119 and the top drive 116), drill string rotating equipment (e.g., the top drive 116 and/or the rotary table and Kelly), the reciprocating slip 161, the drill pipe handling equipment (e.g., the catwalk 131, the PHM 163, the fingerboard 165, and the iron roughneck 151), electrical generators, and other equipment. Accordingly, the RC system 211 may perform power generation and drill pipe handling, hoisting, and rotation operations. The RC system 211 may also serve as a support platform for drilling equipment and staging ground for rig operations, such as connection make up and break out operations described above.

The FC system 212 may include the drilling fluid 140, the pumps 144, valves 166, drilling fluid loading equipment, the solids and gas treatment equipment 170, and/or other fluid control equipment. Accordingly, the FC system 212 may perform fluid operations of the well construction system 100.

The MPDC system 213 may include the RCD 132, the choke manifold 162, the downhole pressure sensors 186, and/or other equipment. The GM system 214 may comprise the gas sensors 174, 178 and/or other equipment. The CCTV system 215 may include the video cameras 198, one or more other input devices (e.g., a keyboard, a touchscreen, etc.), one or more video output devices (e.g., video monitors), various communication equipment (e.g., modems, network interface cards, etc.), and/or other equipment. The CCTV system 215 may be utilized to configure the CCTV system 215, capture real-time video of various portions or subsystems 211-217 of the well construction system 100, and display video signals from the video cameras 198 on the video output devices to display in real-time the various portions or subsystems 211-217 of the well construction system 100. Video captured by the video cameras 198 may also be stored on a memory device associated with the wellsite computing resource environment 205 or another portion of the control system 200, and viewed by the operator 195 on a video output device. The CPC system 216 may comprise the choke manifold 162 and/or other equipment, and the WC system 217 may comprise the well control devices (e.g., the BOP stack 130, the annular fluid control device 132, etc.) and/or other equipment.

The control system 200 may be in real-time communication with the various components of the subsystems 211-217. For example, the local controllers 241-247 may be in communication with various portions of corresponding subsystems 211-217 (e.g., sensors 221-227 and actuators 231-237, shown in FIG. 3) via local communication networks (not shown), and the wellsite computing resource environment 205 may be in communication with the subsystems 211-217 via a data bus or network 202. As described below, data or sensor signals generated by various sensors of the subsystems 211-217 may be made available for use by processes or devices of the control system 200. Similarly, data or control signals generated by the processes or devices of the control system 200 may be automatically communicated to various actuators of the subsystems 211-217, perhaps pursuant to predetermined programming, such as to facilitate well construction operations or processes described herein.

Via the coordinated control device 204 and the local controllers 241-247, the control system 200 may be operable to monitor various sensors of the wellsite subsystems 211-217 in real-time, and to provide real-time control commands to such subsystems 211-217, such that sensor data generated by the various sensors may be utilized to provide real-time control commands to the subsystems 211-217 and other subsystems of the well construction system 100. Data may be generated by both sensors and computation, and may be utilized for coordinated control among two or more of the subsystems 211-217, such as for bottom-hole pressure control.

Figure 3:
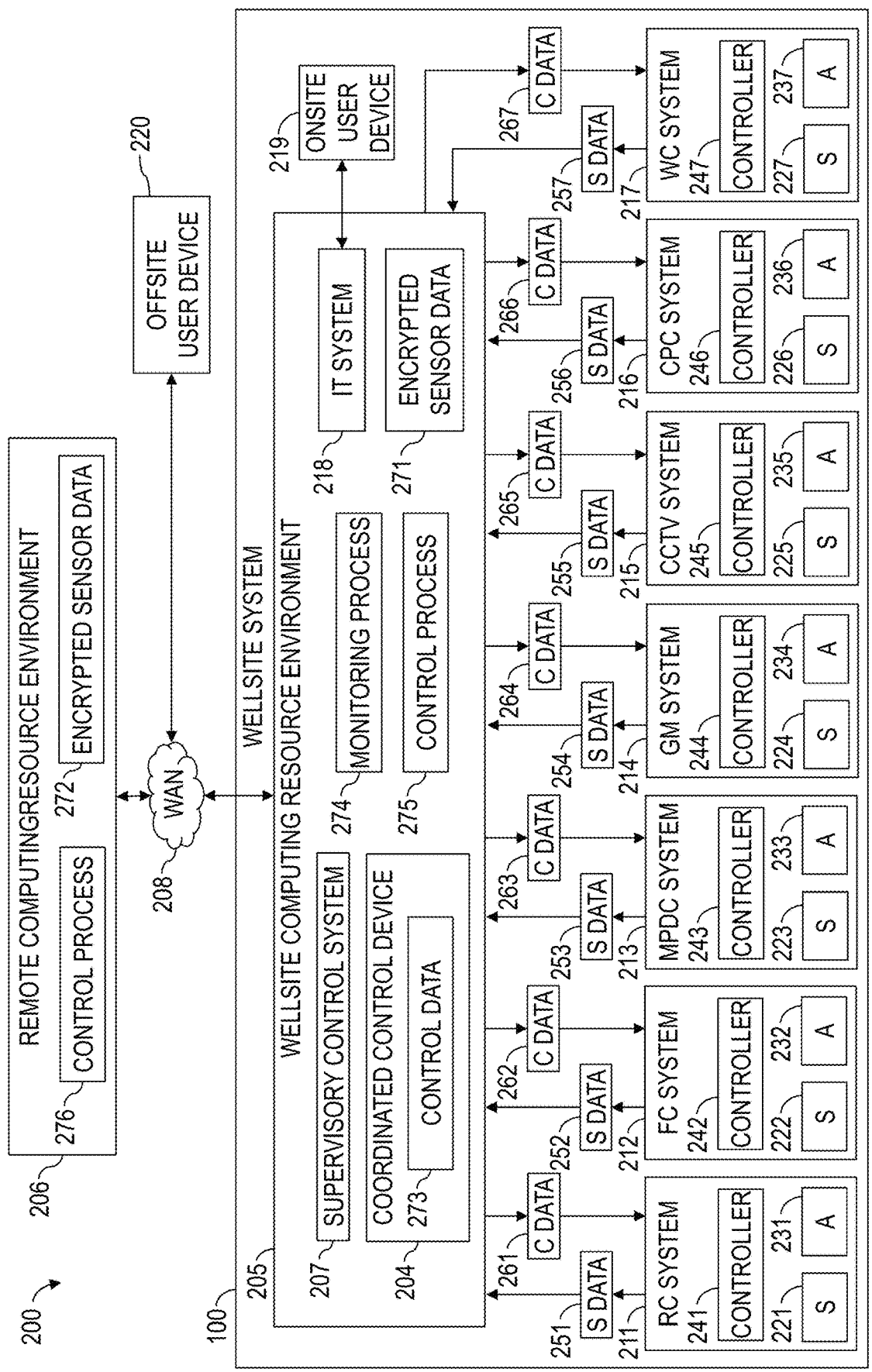
FIG. 3 is a schematic view of at least a portion of an example implementation of apparatus according to one or more aspects of the present disclosure.

FIG. 3 is a schematic view of an example implementation of the control system 200 shown in FIG. 2 according to one or more aspects of the present disclosure. The following description refers to FIGS. 1-3 collectively.

FIG. 3 also depicts the above-described subsystems 211-217 of the well construction system 100, such as the RC system 211, the FC system 212, the MPDC system 213, the GM system 214, the CCTV system 215, the CPC system 216, and the WC system 217. An example implementation of the well construction system 100 may include one or more onsite user devices 219, such as may be communicatively connected or otherwise interact with an information technology (IT) system 218 of the wellsite computing resource environment 205. The onsite user devices 219 may be or comprise stationary and/or portable user devices stationed at the well construction system 100. For example, the onsite user devices 219 may include a desktop computer, a laptop computer, a smartphone or other portable smart device, a personal digital assistant (PDA), a tablet/touchscreen computer, a wearable computer, and/or other devices. The onsite user devices 219 may be or comprise the operator workstation 197 shown in FIG. 1 and described above. The onsite user devices 219 may be operable to communicate with the wellsite computing resource environment 205, such as via the IT system 218, and/or the remote computing resource environment 206, such as via a network 208. The IT system 218 may include communication conduits, software, computers, and other IT equipment facilitating communication between one or more portions of the wellsite computing resource environment 205, and/or between the wellsite computing resource environment 205 and another portion of the well construction system 100, such as the remote computing resource environment 206.

The control system 200 may include (or otherwise be utilized in conjunction with) one or more offsite user devices 220. The offsite user devices 220 may be or comprise a desktop computer, a laptop computer, a smartphone and/or other portable smart device, a PDA, a tablet/touchscreen computer, a wearable computer, and/or other devices. The offsite user devices 220 may be operable to receive and/or transmit information (e.g., for monitoring functionality) from and/or to the well construction system 100, such as by communication with the wellsite computing resource environment 205 via the network 208. The offsite user devices 220 may be utilized for monitoring functions, but may also provide control processes for controlling operation of the various subsystems 211-218 of the well construction system 100.

The offsite user devices 220 and/or the wellsite computing resource environment 205 may also be operable to communicate with the remote computing resource environment 206 via the network 208. The network 208 may be a WAN, such as the internet, a cellular network, a satellite network, other WANs, and/or combinations thereof.

The subsystems 211-217 of the well construction system 100 may include sensors, actuators, and controllers. The controllers may be programmable logic controllers (PLCs) and/or other controllers having aspects similar to the example processing device 600 shown in FIG. 12. The RC system 211 may include one or more sensors (S) 221, one or more actuators (A) 231, and one or more controllers 241. The FC system 212 may include one or more sensors 222, one or more actuators 232, and one or more controllers 242. The MPDC system 213 may include one or more sensors 223, one or more actuators 233, and one or more controllers 243. The GM system 214 may include one or more sensors 224, one or more actuators 234, and one or more controllers 244. The CCTV system 215 may include one or more sensors 225, one or more actuators 235, and one or more controllers 245. The controller 245 of the CCTV system 215 may be or comprise a network server, such as may be operable to selectively grant and forbid access priority and privileges to the video cameras 198 and historical video recordings, serve live video from the video cameras 198 to the client computers (e.g., workstations 197), and serve historical video to the client computers. The server may also operate as a gateway for user authentication and control signals (e.g., pan/tilt, zoom, focus, iris, presets, etc.), as described below. The CPC system 216 may include one or more sensors 226, one or more actuators 236, and one or more controllers 246. The WC system 217 may include one or more sensors 227, one or more actuators 237, and one or more controllers 247.

The sensors 221-227 may include sensors utilized for operation of the well construction system 100. For example, the sensors 221-227 may include cameras, position sensors, pressure sensors, temperature sensors, flow rate sensors, vibration sensors, current sensors, voltage sensors, resistance sensors, gesture detection sensors or devices, voice actuated or recognition devices or sensors, and/or other examples.

The sensors 221-227 may be operable to provide sensor data to the wellsite computing resource environment 205, such as to the coordinated control device 204. For example, the sensors 221-227 may provide sensor data (S Data) 251-257, respectively. The sensor data 251-257 may include signals or information indicative of equipment operation status (e.g., on or off, up or down, set or release, etc.), drilling parameters (e.g., depth, hook load, torque, etc.), auxiliary parameters (e.g., vibration data of a pump), and/or other examples. The acquired sensor data 251-257 may include or be associated with a timestamp (e.g., date and/or time) indicative of when the sensor data 251-257 was acquired. The sensor data 251-257 may also or instead be aligned with a depth or other drilling parameter.

Acquiring the sensor data 251-257 at the coordinated control device 204 may facilitate measurement of the same physical properties at different locations of the well construction system 100, wherein the sensor data 251-257 may be utilized for measurement redundancy to permit continued well construction operations. Measurements of the same physical properties at different locations may also be utilized for detecting equipment conditions among different physical locations at the wellsite surface 104 or within the wellbore 102. Variation in measurements at different wellsite locations over time may be utilized to determine equipment performance, system performance, scheduled maintenance due dates, and the like. For example, slip status (e.g., set or unset) may be acquired from the sensors 221 and communicated to the wellsite computing resource environment 205. Acquisition of fluid samples may be measured by a sensor, such as the sensors 186, 223, and related with bit depth and time measured by other sensors. Acquisition of data from the video cameras 198, 225 may facilitate detection of arrival and/or installation of materials or equipment at the well construction system 100. The time of arrival and/or installation of materials or equipment may be utilized to evaluate degradation of material, scheduled maintenance of equipment, and other evaluations.

The coordinated control device 204 may facilitate control of one or more of the subsystems 211-217 at the level of each individual subsystem 211-217. For example, in the FC system 212, sensor data 252 may be fed into the controller 242, which may respond to control the actuators 232. However, for control operations that involve multiple systems, the control may be coordinated through the coordinated control device 204. For example, coordinated control operations may include the control of downhole pressure during tripping. The downhole pressure may be affected by both the FC system 212 (e.g., pump rate), the MPDC 213 (e.g., choke position of the MPDC), and the RC system 211 (e.g. tripping speed). Thus, when it is intended to maintain certain downhole pressure during tripping, the coordinated control device 204 may be utilized to direct the appropriate control commands to two or more (or each) of the participating subsystems.

Control of the subsystems 211-217 of the well construction system 100 may be provided via a three-tier control system that includes a first tier of the local controllers 241-247, a second tier of the coordinated control device 204, and a third tier of the supervisory control system 207. Coordinated control may also be provided by one or more controllers 241-247 of one or more of the subsystems 211-217 without the use of a coordinated control device 204. In such implementations of the control system 200, the wellsite computing resource environment 205 may provide control processes directly to these controllers 241-247 for coordinated control.

The sensor data 251-257 may be received by the coordinated control device 204 and utilized for control of the subsystems 211-217. The sensor data 251-257 may be encrypted to produce encrypted sensor data 271. For example, the wellsite computing resource environment 205 may encrypt sensor data from different types of sensors and systems to produce a set of encrypted sensor data 271. Thus, the encrypted sensor data 271 may not be viewable by unauthorized user devices (either offsite user devices 220 or onsite user devices 219) if such devices gain access to one or more networks of the well construction system 100. The encrypted sensor data 271 may include a timestamp and an aligned drilling parameter (e.g., depth) as described above. The encrypted sensor data 271 may be communicated to the remote computing resource environment 206 via the network 208 and stored as encrypted sensor data 272.

The wellsite computing resource environment 205 may provide the encrypted sensor data 271, 272 available for viewing and processing offsite, such as via the offsite user devices 220. Access to the encrypted sensor data 271, 272 may be restricted via access control implemented in the wellsite computing resource environment 205. The encrypted sensor data 271, 272 may be provided in real-time to offsite user devices 220 such that offsite personnel may view real-time status of the well construction system 100 and provide feedback based on the real-time sensor data. For example, different portions of the encrypted sensor data 271, 272 may be sent to the offsite user devices 220. The encrypted sensor data 271, 272 may be decrypted by the wellsite computing resource environment 205 before transmission, and/or decrypted on the offsite user device 220 after encrypted sensor data is received. The offsite user device 220 may include a thin client (not shown) configured to display data received from the wellsite computing resource environment 205 and/or the remote computing resource environment 206. For example, multiple types of thin clients (e.g., devices with display capability and minimal processing capability) may be utilized for certain functions or for viewing various sensor data 251-257.

The wellsite computing resource environment 205 may include various computing resources utilized for monitoring and controlling operations, such as one or more computers having a processor and a memory. For example, the coordinated control device 204 may include a processing device, such as the processing device 600 shown in FIG. 12, having a processor and memory for processing the sensor data, storing the sensor data, and issuing control commands responsive to the sensor data. As described above, the coordinated control device 204 may control various operations of the subsystems 211-217 via analysis of sensor data 251-257 from one or more of the wellsite subsystems 211-217 to facilitate coordinated control between the subsystems 211-217. The coordinated control device 204 may generate control data 273 (e.g., signals, commands, coded instructions) to execute control of the subsystems 211-217. The coordinated control device 204 may transmit the control data 273 to one or more subsystems 211-217. For example, control data (C Data) 261 may be sent to the RC system 211, control data 262 may be sent to the FC system 212, control data 263 may be sent to the MPDC system 213, control data 264 may be sent to the GM system 214, control data 265 may be sent to the CCTV system 215, control data 266 may be sent to the CPC system 216, and control data 267 may be sent to the WC system 217. The control data 261-267 may include, for example, human operator commands (e.g., turn on or off a pump, switch on or off a valve, update a physical property set-point, etc.). The coordinated control device 204 may include a fast control loop that directly obtains sensor data 251-257 and executes, for example, a control algorithm. The coordinated control device 204 may include a slow control loop that obtains data via the wellsite computing resource environment 205 to generate control commands.

The coordinated control device 204 may intermediate between the supervisory control system 207 and the local controllers 241-247 of the subsystems 211-217, such as may permit the supervisory control system 207 to control the subsystems 211-217. The supervisory control system 207 may include, for example, devices for entering control commands to perform operations of the subsystems 211-217. The coordinated control device 204 may receive commands from the supervisory control system 207, process such commands according to a rule (e.g., an algorithm based upon the laws of physics for drilling operations), and provide control data to one or more subsystems 211-217. The supervisory control system 207 may be provided by the wellsite operator 195 and/or process monitoring and control program. In such implementations, the coordinated control device 204 may coordinate control between discrete supervisory control systems and the subsystems 211-217 while utilizing control data 261-267 that may be generated based on the sensor data 251-257 received from the subsystems 211-217 and analyzed via the wellsite computing resource environment 205. The coordinated control device 204 may receive the control data 251-257 and then dispatch control data 261, including interlock commands, to each subsystem 211-217. The coordinated control device 204 may also or instead just listen to the control data 251-257 being dispatched to each subsystem 221-227 and then initiate the machine interlock commands to the relevant local controller 241-247.

The coordinated control device 204 may run with different levels of autonomy. For example, the coordinated control device 204 may operate in an advice mode to inform wellsite operators 195 to perform a specific task or take specific corrective action based on sensor data 251-257 received from the various subsystems 211-217. While in the advice mode, the coordinated control device 204 may, for example, advise or instruct the wellsite operator 195 to perform a standard work sequence when gas is detected on the rig floor 114, such as to close the annular BOP 132. Furthermore, if the wellbore 102 is gaining or losing drilling fluid 140, the coordinated control device 204 may, for example, advise or instruct the wellsite operator 195 to modify the density of the drilling fluid 140, modify the pumping rate of the drilling fluid 140, and/or modify the pressure of the drilling fluid within the wellbore 102.

The coordinated control device 204 may also operate in a system/equipment interlock mode, whereby certain operations or operational sequences are prevented based on the received sensor data 251-257. While operating in the interlock mode, the coordinated control device 204 may manage interlock operations among the various equipment of the subsystems 211-217. For example, if a pipe ram of the BOP stack 130 is activated, the coordinated control device 204 may issue an interlock command to the RC system controller 241 to stop the drawworks 119 from moving the drill string 120. However, if a shear ram of the BOP stack 130 is activated, the coordinated control device 204 may issue an interlock command to the controller 241 to operate the drawworks 119 to adjust the position of the drill string 120 within the BOP stack 130 before activating the shear ram, so that the shear ram does not align with a shoulder of the tubulars forming the drill string 120.

The coordinated control device 204 may also operate in an automated sequence mode, whereby certain operations or operational sequences are automatically performed based on the received sensor data 251-257. For example, the coordinated control device 204 may activate an alarm and/or stop or reduce operating speed of the pipe handling equipment when a wellsite operator 195 is detected close to a moving iron roughneck 151, the PHM 163, or the catwalk 131. As another example, if the wellbore pressure increases rapidly, the coordinated control device 204 may close the annular BOP 132, close one or more rams of the BOP stack 130, and/or adjust the choke manifold 162.

The wellsite computing resource environment 205 may comprise or execute a monitoring process 274 (e.g., an event detection process) that may utilize the sensor data 251-257 to determine information about status of the well construction system 100 and automatically initiate an operational action, a process, and/or a sequence of one or more of the subsystems 211-217. The monitoring process 274 may initiate the operational action to be caused by the coordinated control device 204. Depending on the type and range of the sensor data 251-257 received, the operational actions may be executed in the advice mode, the interlock mode, or the automated sequence mode.

For example, the monitoring process 274 may determine a drilling state, equipment health, system health, a maintenance schedule, or combination thereof, and initiate an advice to be generated. The monitoring process 274 may also detect abnormal drilling events, such as a wellbore fluid loss and gain, a wellbore washout, a fluid quality issue, or an equipment event based on job design and execution parameters (e.g., wellbore, drilling fluid, and drill string parameters), current drilling state, and real-time sensor information from the surface equipment 110 (e.g., presence of hazardous gas at the rig floor, presence of human wellsite operators in close proximity to moving pipe handling equipment, etc.) and the BHA 124, initiating an operational action in the automated mode. The monitoring process 274 may be connected to the real-time communication network 202. The coordinated control device 204 may initiate a counteractive measure (e.g., a predetermined action, process, or operation) based on the events detected by the monitoring process 274.

The term "event" as used herein may include, but not be limited to, an operational and safety related event described herein and/or another operational and safety related event that can take place at a well construction system. The events described herein may be detected by the monitoring process 274 based on the sensor data 251-257 (e.g., sensor signals or information) received and analyzed by the monitoring process 274.

The wellsite computing resource environment 205 may also comprise or execute a control process 275 that may utilize the sensor data 251-257 to optimize drilling operations, such as the control of drilling equipment to improve drilling efficiency, equipment reliability, and the like. For example, the acquired sensor data 252 may be utilized to derive a noise cancellation scheme to improve electromagnetic and mud pulse telemetry signal processing. The remote computing resource environment 206 may comprise or execute a control process 276 substantially similar to the control process 275 that may be provided to the wellsite computing resource environment 205. The monitoring and control processes 274, 275, 276 may be implemented via, for example, a control algorithm, a computer program, firmware, or other hardware and/or software.

The wellsite computing resource environment 205 may include various computing resources, such as a single computer or multiple computers. The wellsite computing resource environment 205 may further include a virtual computer system and a virtual database or other virtual structure for collected data, such as may include one or more resource interfaces (e.g., web interfaces) that facilitate the submission of application programming interface (API) calls to the various resources through a request. In addition, each of the resources may include one or more resource interfaces that facilitate the resources to access each other (e.g., to facilitate a virtual computer system of the computing resource environment to store data in or retrieve data from the database or other structure for collected data). The virtual computer system may include a collection of computing resources configured to instantiate virtual machine instances. A wellsite operator 195 may interface with the virtual computer system via the offsite user device 220 or the onsite user device 219. Other computer systems or computer system services may be utilized in the wellsite computing resource environment 205, such as a computer system or computer system service that provides computing resources on dedicated or shared computers/servers and/or other physical devices. The wellsite computing resource environment 205 may include a single server (in a discrete hardware component or as a virtual server) or multiple servers (e.g., web servers, application servers, or other servers). The servers may be, for example, computers arranged in physical and/or virtual configuration.

The wellsite computing resource environment 205 may also include a database that may be or comprise a collection of computing resources that run one or more data collections. Such data collections may be operated and managed by utilizing API calls. The data collections, such as the sensor data 251-257, may be made available to other resources in the wellsite computing resource environment 205, or to user devices (e.g., onsite user device 219 and/or offsite user device 220) accessing the wellsite computing resource environment 205. The remote computing resource environment 206 may include computing resources similar to those described above, such as a single computer or multiple computers (in discrete hardware components or virtual computer systems).

The wellsite computing resource environment 205 may facilitate an integral display or output means showing various information, such as the sensor data 251-257, the control data 261-267, processes taking place, events being detected, and drilling equipment operation status and control information. The wellsite computing resource environment 205 may be communicatively connected with one or more HMI devices. The HMI devices may include one or more input devices for receiving commands from the wellsite operators 195 to control the actuators 231-237 of a selected one of the subsystems 211-217. The input means may be provided via hardware controls, such as physical buttons, slider bars, switches/rotary switches, joysticks, keyboards, mice, and the like. The HMI devices may also include one or more output devices, such as video output devices (e.g., LCD screens), printers, and audio speakers. The HMI devices may be implemented as part of, or utilized in association with, the onsite and/or offsite user devices 219, 220.

Selected information from the operations of the subsystems 211-217 may be shown to the wellsite operator 195 via multiple display screens. Each display screen may display information related to a corresponding subsystem 211-217 and other selected information. Each display screen may integrate selected sensor data 251-257 from the corresponding subsystem 211-217 with information from the monitoring process 274, the control process 275, and/or the control data 261-267 generated by the coordinated control device 204, for display to the wellsite operator 195. The display screens may be shown or displayed alternately on a single video output device or simultaneously on one or more video output devices. When utilizing a single video output device, the display screen to be displayed may be selected by the wellsite operator 195 via the input means. The display screen to be displayed on the video output device may also or instead be selected automatically by the monitoring process 274 based on operational events detected or planned at the well construction system 100 (e.g., a drilling process or event), such that information relevant to an event currently taking place is displayed. Each display screen may also include operational controls in the form of virtual or software buttons, toggles, levers, slide bars, icons, and the like (e.g., on/off buttons, increase/decrease slide bars), such as may be utilized to select the display screen and/or control operation of the subsystem 211-217 associated with the display screen. The plurality of display screens described herein may be collectively referred to hereinafter as an integrated display.

The display screens may also display video signals (e.g., one or more video feeds) generated by one or more of the video cameras 198 of the CCTV system 215. One or more video signals may be displayed on a dedicated video output device and/or one or more video signals may be displayed in a picture-in-picture (PIP) video window inset or embedded on a display screen showing other information. Sourcing (i.e., selection) of the video camera 198 whose video signal is to be displayed on the display screen may be automated based on operational events (e.g., drilling events, drilling operation processes, etc.) at the well construction system 100, such that video signals relevant to an event currently taking place are displayed.

Figure 4:
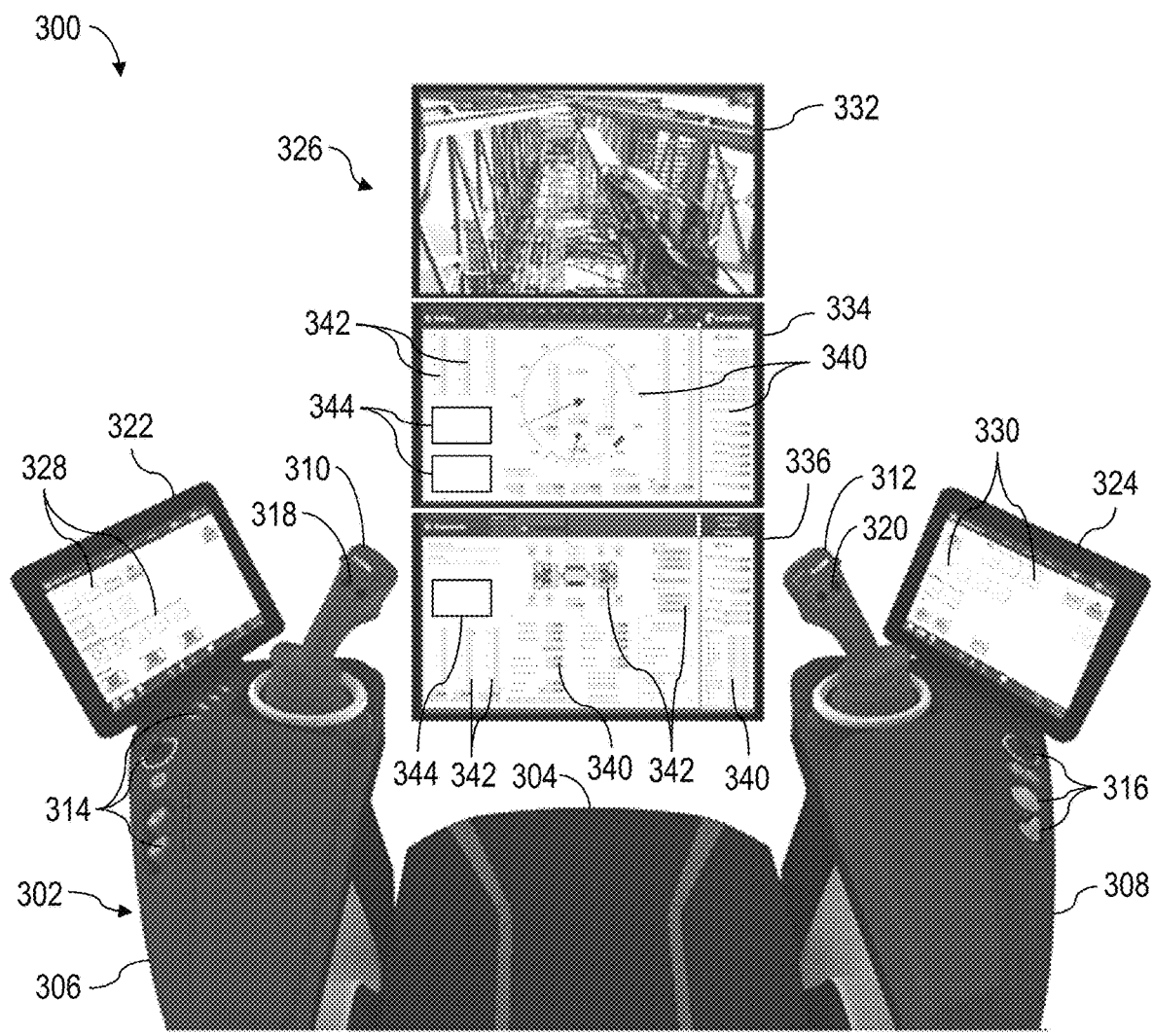
FIG. 4 is a schematic view of at least a portion of an example implementation of apparatus according to one or more aspects of the present disclosure.

FIG. 4 is a schematic view of a portion of an example implementation of a wellsite operator control workstation 300 communicatively connected with the processing device 192 (e.g., the wellsite computing resource environment 205) and/or other portions of the well construction system 100 according to one or more aspects of the present disclosure. The operator workstation 300 comprises an operator chair 302 and an HMI system comprising a plurality of input and output devices disposed in association with and/or integrated with the operator chair 302 to permit the wellsite operator 195 to enter commands or other information to the processing device 192 and receive information from the processing device 192 and other portions of the well construction system 100. The operator chair 302 may include a seat 304, a left armrest 306, and a right armrest 308.

The input devices of the operator workstation 300 may include a left joystick 310, a right joystick 312, and a plurality of buttons, knobs, dials, switches, or other physical controls 314, 315, 316, 318, 320. One or more of the joysticks 310, 312 and/or the physical controls 314, 315, 316 may be integrated into the corresponding armrests 306, 308 of the operator chair 302 to permit the wellsite operator 195 to operate these input devices from the operator chair 304. Furthermore, one or more of the physical controls 318, 320 may be integrated into the corresponding joysticks 310, 312 to permit the wellsite operator 195 to operate these physical controls 318, 320 while operating the joysticks 310, 312. The physical controls 315 may be emergency stop (E-stop) buttons, which may be electrically connected to E-stop relays of one or more pieces of wellsite equipment (e.g., the iron roughneck 151, the PHM 163, the drawworks 119, the top drive 116, etc.), such that the wellsite operator 195 can shut down the wellsite equipment during emergencies and other situations.

The output devices of the operator workstation 300 may include one or more video output devices 322, 324, 326 (e.g., video monitors) disposed in association with the operator chair 304 and operable to display to the wellsite operator 195 information from the processing device 192 and other portions of the well construction system 100. The video output devices may be implemented as one or more LCD displays, LED displays, plasma displays, cathode ray tube (CRT) displays, and/or other types of displays. The video output devices 322, 324 may be or comprise touch screens operable to display information to the wellsite operator 195 and receive commands or information from the wellsite operator 195 via a plurality of software buttons, switches, knobs, dials, icons, and/or other software controls 328, 330 displayed on the video output devices 322, 324. The software controls 328, 330 may be operated (e.g., selected) via finger contact by the wellsite operator 195. The video output devices 322, 324 may be disposed on or integrated into the arm rests 306, 308 or other parts of the operator chair 304 to permit the wellsite operator 195 to operate the software controls 328, 330 displayed on the video output devices 322, 324 from the operator chair 304.

The video output devices 326 may be disposed in front of or otherwise adjacent the operator chair 302. The video output devices 326 may include a plurality of video output devices 332, 334, 336, each dedicated to displaying predetermined information in a predetermined (e.g., programmed) manner. Although the video output devices 326 are shown comprising three video output devices 332, 334, 336, the video output devices 326 may be or comprise one, two, four, or more video output devices. When one or two video output devices are utilized, different portions of screens displayed on the two video output devices may each be dedicated to displaying predetermined information in a predetermined manner.

One or more of the video output devices 326 may be operated as both input and output devices. For example, the video output devices 334, 336 may display information related to the control and monitoring of the various subsystems 211-217 of the well construction system 100. The video output devices 334, 336 may further display sensor signals or information 340 generated by the various sensors 221-227 of the well construction system 100 to permit the wellsite operator 195 to monitor operational status of the subsystems 211-217. The video output devices 334, 336 may also display a plurality of software buttons, icons, switches, knobs, slide bars, dials, or other software controls 342 displayed on the video output devices 334, 336 to permit the wellsite operator 195 to control the various actuators 231-237 or other portions of the subsystems 211-217. The software controls 342 may be operated by the physical controls 314, 316, the joysticks 310, 312, the touchscreens 322, 324, or other input devices of the operator workstation 300.

One or more portions of the operator workstation 300 may comprise or form a portion of the CCTV system 215 described above and shown in FIGS. 1-3. For example, one or more of the video output devices 326 may be configured to display the video signals generated by one or more of the video cameras 198. The video output device 332 may operate purely as an output device dedicated for displaying the video signals generated by one or more of the video cameras 198. When displaying the video signals from multiple video cameras 198, the display screen of the video output device 326 may be divided into or comprise multiple video windows, each displaying a corresponding video signal. One or more of the video output devices 334, 336 may display an integrated display screen displaying the sensor information 340, the software controls 342, and the video signals from one or more of the video cameras 198. For example, one or both of the display screens of the video output devices 334, 336 may include one or more PIP video windows 344, each displaying a video signal from a corresponding one of the video cameras 198. The PIP video windows 344 may be embedded or inset on the corresponding display screens along or adjacent the sensor information 340 and the software controls 342.

Figure 5:
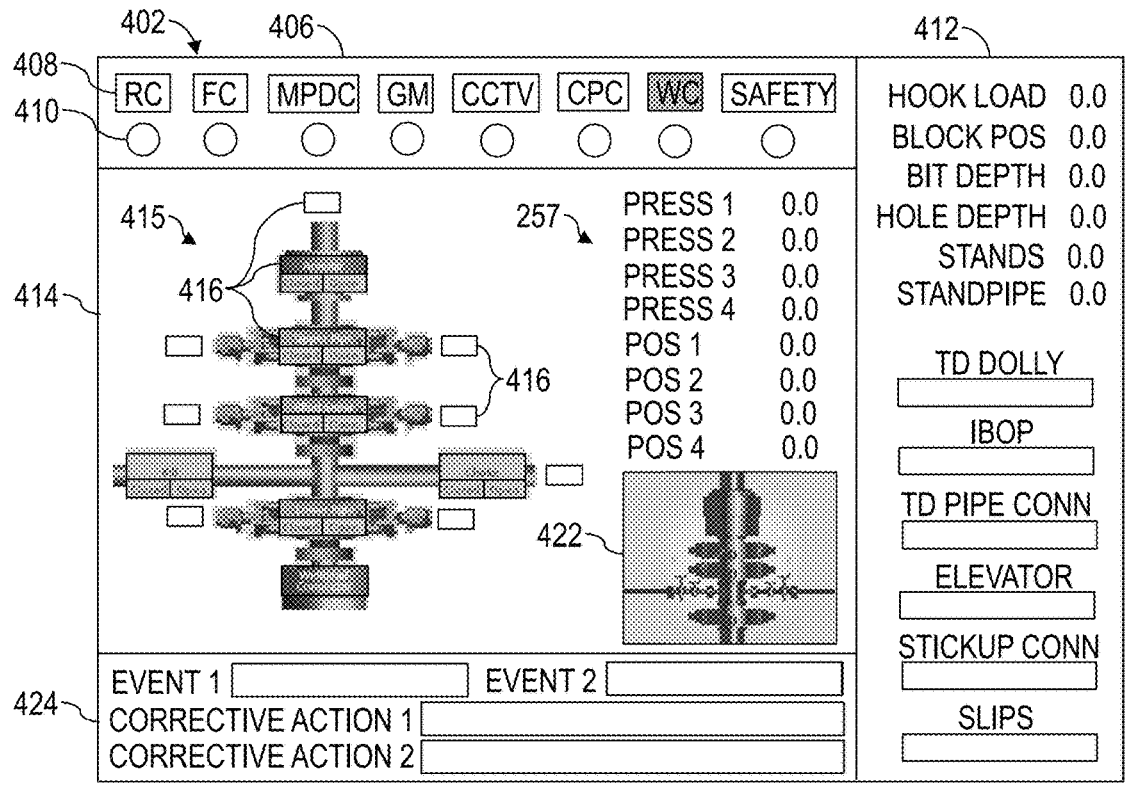
FIG. 5 is a schematic view of at least a portion of an example implementation of apparatus according to one or more aspects of the present disclosure.
Figure 6:
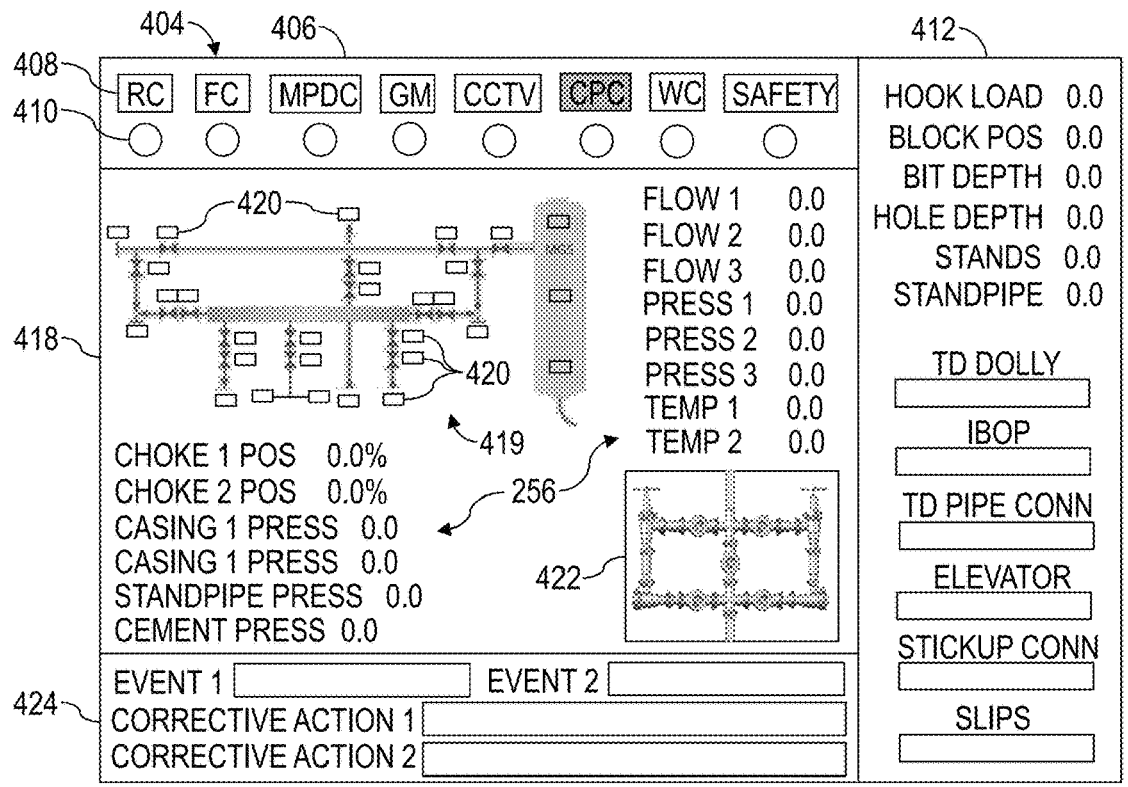
FIG. 6 is a schematic view of at least a portion of an example implementation of apparatus according to one or more aspects of the present disclosure.

FIGS. 5 and 6 are views of example implementations of display screens 402, 404 generated by the processing device 192 (e.g., the wellsite computing resource environment 205) and displayed on one or more of the video output devices 326 according to one or more aspects of the present disclosure. The example display screen 402 displays various sensor information and software controls related to the control and monitoring of the WC system 217 and other related drilling or equipment information. The example display screen 404 displays various sensor information and software controls related to the control and monitoring of the CPC system 216 and other related drilling or equipment information.

The display screens, including the display screens 402, 404, may comprise a wellsite subsystem selector/indicator window or area 406, which may be utilized to switch between or select which one or more of the display screens are being displayed on the video output device. The selector/indicator area 406 may be continuously displayed regardless of which display screen is being shown on the video output device. The area 406 may comprise a subsystem selection menu 408, such as a plurality of indicator bars, tabs, or buttons, each listing a subsystem 211-217 of the well construction system 100. The wellsite operator 195 may operate (e.g., click on, touch, highlight, and/or otherwise select) one of the buttons to select and view the display screen and the associated subsystem information. The button associated with the selected subsystem 211-217 may light up, change color, and/or otherwise indicate which display screen and, thus, subsystem 211-217, is being shown. The selector/indicator area 406 may also include a SAFETY button, which may be selected to show the display screen with status of various safety equipment of the well construction system 100, including gas detectors 174, 178 and fire detectors. Although the subsystem selection menu 408 is shown as a list that is permanently maintained on the display screens 402, 404, the subsystem selection menu 408 may be implemented as a dropdown or pop-up menu, displaying a list of subsystems 211-217 when clicked on or otherwise operated.

The selector/indicator area 406 may also include a plurality of alarms or event indicators 410 (e.g., lights), each associated with a corresponding subsystem selection button. The monitoring process 274 may activate (e.g., light up, change color, etc.) one or more of the event indicators 410 to show or alarm the wellsite operator 195 of an operational event at or associated with a corresponding subsystem 211-217 that may be associated with a predetermined corrective action or another action by the wellsite operator 195. Responsive to the event indicator 410 being activated, the wellsite operator 195 may switch to a display screen corresponding to the activated event indicator to assess the event and/or implement appropriate counteractive measures or actions. Instead of manually changing between the display screens, the processing device 192 may automatically change the display screen to show the display screen corresponding to a subsystem 211-217 experiencing the event.

The display screens, including the display screens 402, 404, may further comprise a driller information window or area 412 displaying selected sensor data 251-257 or information related to status of drilling operations. For example, the area 412 may include selected sensor data 251 from the RC system 211, selected sensor data 252 from the FC system 212, and/or selected sensor data from the WC system 217. The area 412 may display information such as hook load, traveling block position, drill bit depth, wellbore depth, number of stands or tubulars in the wellbore, standpipe pressure, top drive dolly location, inside BOP position, top drive pipe connection status, elevator status, stickup connection status, and slips status. The area 412 may be continuously displayed regardless of which display screen is being shown on the video output device.

Each display screen, including the display screens 402, 404, may further comprise a corresponding subsystem information window or area 414, 418, respectively, displaying selected sensor data 251-257 or information related to a subsystem 211-217 being shown on the display screen. The information displayed in the area 414 may switch when the wellsite operator 195 or the processing device 192 switches between the display screens of the integrated display.

The subsystem information area 414 of the display screen 402 may comprise a schematic view 415 of the BOP stack 130 and a plurality of status bars 416 indicative of status of corresponding portions of the BOP stack 130. The status bars 416 may display sensor data 257 showing operational parameters of the WC system 217 such as flow, pressure, temperature, and preventer position. The area 414 may further show the sensor data 257 of the WC system 217 in table or list form. One or more operational parameters (e.g., preventer position) of the WC system 217 may be changed, for example, by entering in the status bars 416 or on the list 257 the intended values of the one or more operational parameters, causing the coordinated control device 204 to transmit corresponding control data 267 to the controller 247 of the WC system 217 to change the operational parameters as intended.

The subsystem information area 418 of the display screen 404 may comprise a schematic view 419 of the choke manifold 162 and a plurality of status bars 420 indicative of status of corresponding portions of the choke manifold 162. The status bars 420 may display sensor data 256 showing operational parameters of the CPC system 216, such as flow, pressure, temperature, and position. The area 418 may further show the sensor data 256 of the CPC system 216 in table or list form. One or more operational parameters of the CPC system 216 may be changed, for example, by entering in the status bars 420 or on the list 256 the intended values of the one or more operational parameters, causing the coordinated control device 204 to transmit corresponding control data 266 to the controller 246 of the CPC system 216 to change the operational parameters as intended.

Each display screen, including the display screens 402, 404, may further include a one or more PIP video windows 422, each displaying in real-time a video signal from a predetermined video camera 198 to display a predetermined portion of the well construction system 100, a predetermined one of the subsystems 211-217, and/or predetermined wellsite equipment. The PIP video windows 422 may be embedded or inset on the corresponding display screens 402, 404 along or adjacent the sensor information and the software controls displayed on the display screens 402, 404. The view shown in the PIP video window 422 may be switched between different video cameras 198. For example, the PIP video window 422 of the display screen 402 may show a real-time view of the BOP stack 130 and the PIP video window 422 of the display screen 404 may show a real-time view of the choke manifold 162.

Each display screen, including the display screens 402, 404, may also comprise an event description window or area 424 listing and/or describing one or more operational events taking place at the well construction system 100. The event description area 424 may also list and/or describe one or more counteractive measures (e.g., corrective actions, operational sequences) related to the event that may be performed or otherwise implemented in response to the event. Depending on the event and/or mode (e.g., advice, interlock, automated) in which the coordinated control device 204 is operating, the processing device 192 may just describe the corrective action within the event description area 424, and the wellsite operator 195 may implement such corrective action. However, the processing device 192 may automatically implement the corrective action, or cause the corrective action to be automatically implemented, such as by transmitting predetermined control data 261-267 to the controller 241-247 of the corresponding subsystem 211-217.

The information displayed in the area 424 may just display events and/or corrective actions related to the display screen and the subsystem 211-217 being viewed and, thus, change when switching between the display screens of the integrated display. However, the information displayed in the area 424 may not change when switching between the display screens, and may list events and/or corrective actions related to each subsystem 211-217, such as in chronological order or in the order of importance. As described above, the coordinated control device 204 or another portion of the processing device 192 may automatically change the display screen to show the subsystem 211-217 experiencing the event and the corresponding description and/or corrective action related to the event.

Each display screen, including the display screens 402, 404, may be adjusted or otherwise configured by the wellsite operator 195 to display one or more of the various information windows or areas in a preferred or otherwise intended position on each display screen. For example, the selector/indicator area 406 may be displayed at the bottom of the display screens 402, 404, the event description area 424 may be displayed at the top of the display screens 402, 404, and the driller information area 412 may be displayed on the left side of the display screens 402, 404. Furthermore, the location and/or size (i.e., dimensions) of the PIP video windows 422 displayed on each display screen, including the display screens 402, 404, may also be adjusted or otherwise selected. The placement of the various information windows or areas and the PIP video windows 422 on the display screens may be moved or selected, for example, via one or more of the physical controls physical controls 314, 316, 318, 320, such as by entering an intended location of the information areas and PIP video windows 422 or by dragging the information areas and PIP video windows 422 to an intended location on the display screens.

One or more portions of the operator workstation 300, such as the input and output devices, may also be utilized by the wellsite operator 195 to set, configure, or otherwise control operation of the CCTV system 215. For example, one or more of the input devices of the operator workstation 300 may be utilized to enter into the processing device 192 various video display settings to cause the CCTV system 215 to operate based on such video display settings. The input devices may be utilized to configure the number of video signals displayed on each of the video output devices 326, and to configure the size and position of the PIP video windows 344, 422. The input devices of the operator workstation 300 may be further utilized to associate a video camera 198 with a video output device 326 and/or PIP video window 344, 422 to select what portions of the well construction system 100 are shown on which video output device 326 and/or PIP video window 344, 422, and when such portions of the well construction system 100 are shown during the well construction operation. Thus, based on such associations, the processing device 192 may be operable to cause the CCTV system 215 to automatically display predetermined objects and/or areas of the well construction system 100 during corresponding successive stages of the well construction operation. The displayed objects and/or areas may be those that the wellsite operator 195 may utilize to confirm predetermined parameters, configurations, statuses, and the like, before the automatic sequence of the well construction operation continues. Such aspects may reduce and/or eliminate manual operator input, which may save time during automatic sequences.

The video display settings that may be entered into the processing device 192 to configure the CCTV system 215 may thus comprise associations between each successive operational stage of a well construction operation during which the well construction system 100 forms the wellbore 102, and the one or more of the video cameras 198 capturing one or more portions of the well construction system 100 performing such operational stage of the well construction operation. After such associations are entered into the processing device 192, the processing device 192 may automatically display on one or more of the video output devices 326 one or more of the video signals from the one or more of the video cameras 198 associated with each successive operational stage of the well construction operation, such as to automatically show one or more portions of the well construction system 100 performing each successive operational stage of the well construction operation. The video display settings that may be entered into the processing device 192 to configure the CCTV system 215 may further comprise associations between each operational event and one of the video cameras 198 capturing a portion of the well construction system 100 experiencing that operational event. After such associations are entered into the processing device, and upon detecting one of the operational events, the processing device 192 may automatically display on one or more of the video output devices 326 the video signal from the video camera 198 associated with the detected operational event, such as to automatically show the well construction system 100 portion experiencing the detected operational event.

The video display settings may be entered into the processing device 192 via one or more CCTV configuration display screens displayed on one or more of the video output devices 322, 324, 326. Each CCTV configuration screen may display information related to status of various portions of the CCTV system 215 and the software controls 328, 330, 342, which may be operated to enter the video display settings into the processing device 192 to configure the CCTV system 215. In an example implementation, the CCTV configuration display screens may be displayed on one or both of the video output devices 322, 324 (i.e., touchscreens) permitting the wellsite operator 195 to enter the video display settings from the operator chair 304 via finger contact with the corresponding software controls 328, 330.

FIGS. 7-11 are example implementations of CCTV configuration display screens 500, 502, 504, 506, respectively, generated by the processing device 192 and displayed on one or more of the video output devices 322, 324, 326 for configuring or otherwise controlling the CCTV system 215 by the wellsite operator 195 according to one or more aspects of the present disclosure. The CCTV configuration display screens 500, 502, 504, 506 may be displayed on one or both of the video output devices 322, 324 (i.e., touchscreens), permitting the wellsite operator 195 to enter the video display settings from the operator chair 304 via finger contact with the corresponding software controls 328, 330.

Figure 7:
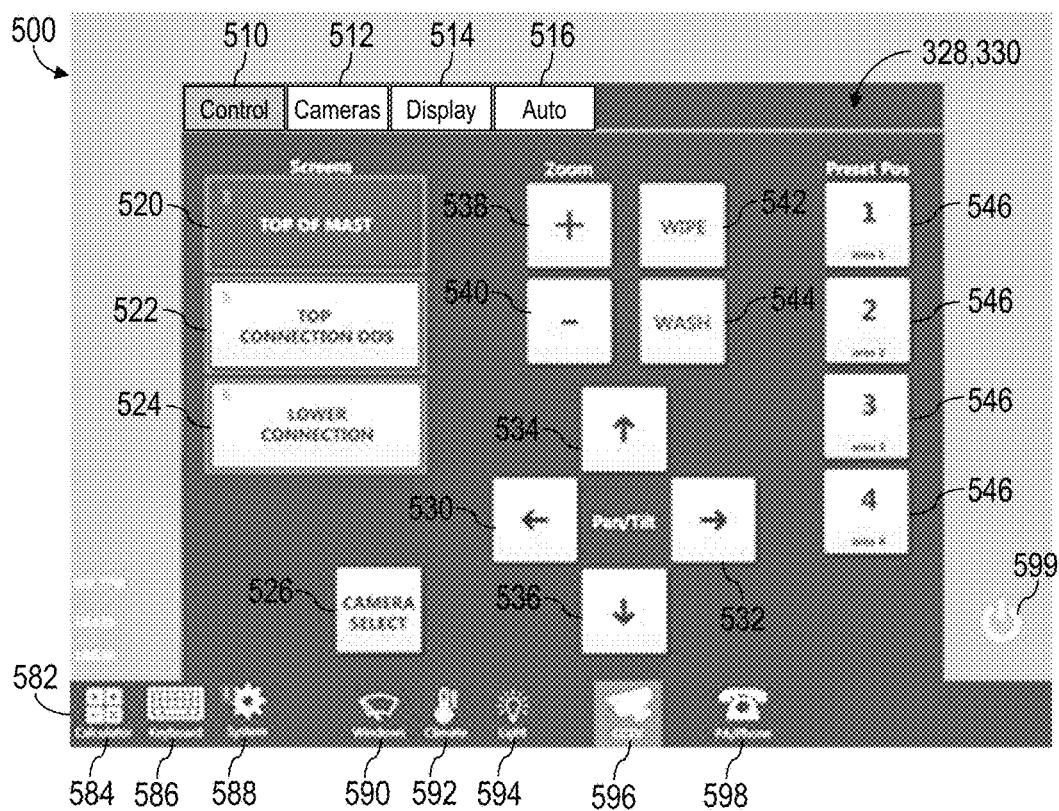
FIG. 7 is a schematic view of at least a portion of an example implementation of apparatus according to one or more aspects of the present disclosure.

Each of the CCTV configuration display screens 500, 502, 504, 506 displays different sets of software controls 328, 330 and, thus, may be utilized to configure different features or aspects of the CCTV system 215. Each of the screens 500, 502, 504, 506 may be displayed by selecting a corresponding tab 510, 512, 514, 516 displayed on each of the screens 500, 502, 504, 506, although additional and/or different tabs are also within the scope of the present disclosure. For example, a video camera control tab 510 may be selected (e.g., operated via finger contact) to display the screen 500, a camera selection tab 512 may be selected to display the screen 502, an advanced display configuration tab 514 may be selected to display the screen 504, and an automatic video display configuration tab 516 may be selected to display the screen 506. The selected tab may be highlighted, differently colored, or otherwise distinguished from the non-selected tabs, such as depicted in FIG. 7 by the selected tab 510.

The configuration screen 500 includes video signal source indicator buttons 520, 522, 524, each corresponding to one of the video output devices 332, 334, 336 and operable to visually indicate which video camera video signals are displayed on each of the video output devices 332, 334, 336. In the example implementation of the screen 500 shown in FIG. 7, the indicator button 520 indicates that the video output device 332 displays the video signal from a video camera 198 capturing real-time video of (i.e., pointed toward) the top of the mast portion of the well construction system 100. The indicator button 522 indicates that the video output device 334 displays the video signal from a video camera 198 capturing real-time video of the off-driller's side (ODS) top connection (i.e., top drive connection handover for triple stand drill pipe between a tubular delivery arm (TDA) 167 and the top drive 116). The displayed video may be used to verify that the elevator 129 on the top drive 116 is closed and that the fingerboard latches 169 are open or closed. The indicator button 524 indicates that the video output device 336 displays the video signal from a video camera 198 capturing real-time video of the lower connection (i.e., top drive connection with a single drill pipe). The displayed video may provide the wellsite operator 195 with a visual feedback when making up single connections. As described above, the video signals shown on the video output devices 334, 336 may be shown within one or more corresponding PIP video windows 334, 422.

The indicator buttons 520, 522, 524 for actively displayed ones of the selected video camera video signals may be highlighted, differently colored, or otherwise distinguished from the non-displayed ones of the selected video camera video signals. For example, in FIG. 7, the video signal from the video camera 198 capturing real-time video of the top of the mast is currently being displayed on the video output device 332, and the video signals from the video cameras 198 capturing real-time video of the ODS top connection and the lower connection are not currently being displayed on the video output devices 334, 336. The display/non-display status may be toggled by operating (e.g., touching, clicking on, etc.) the corresponding indicator buttons 520, 522, 524.

Highlighting of the indicator buttons 520, 522, 524 may also or instead inform the wellsite operator 195 what video camera 198 is active, whereby operating one or more of the other buttons on the display screen 500 will then apply to the active video camera 198. For example, when the indicator button 520 is highlighted, the video camera 198 associated with the indicator button 520 is active on the video output device 332 and the other buttons on the display screen 500 will apply to such video camera 198. If the wellsite operator 195 clicks on or otherwise operates the indicator button 522, the video camera 198 associated with the indicator button 522 will become active and the other buttons on the display screen 500 will apply to such video camera 198.

The CCTV system 215 may be configured to display on the video output device 332 either a single video signal in full screen, as shown in the display 332 depicted in FIG. 4, or multiple video signals from multiple corresponding video cameras 198, simultaneously. For example, the CCTV system 215 may be configured to display two video signals from two corresponding video cameras 198 (i.e., a bi-view video signal feed) with each video signal filling a corresponding half of the display screen of the video output device 332.

Figure 8:
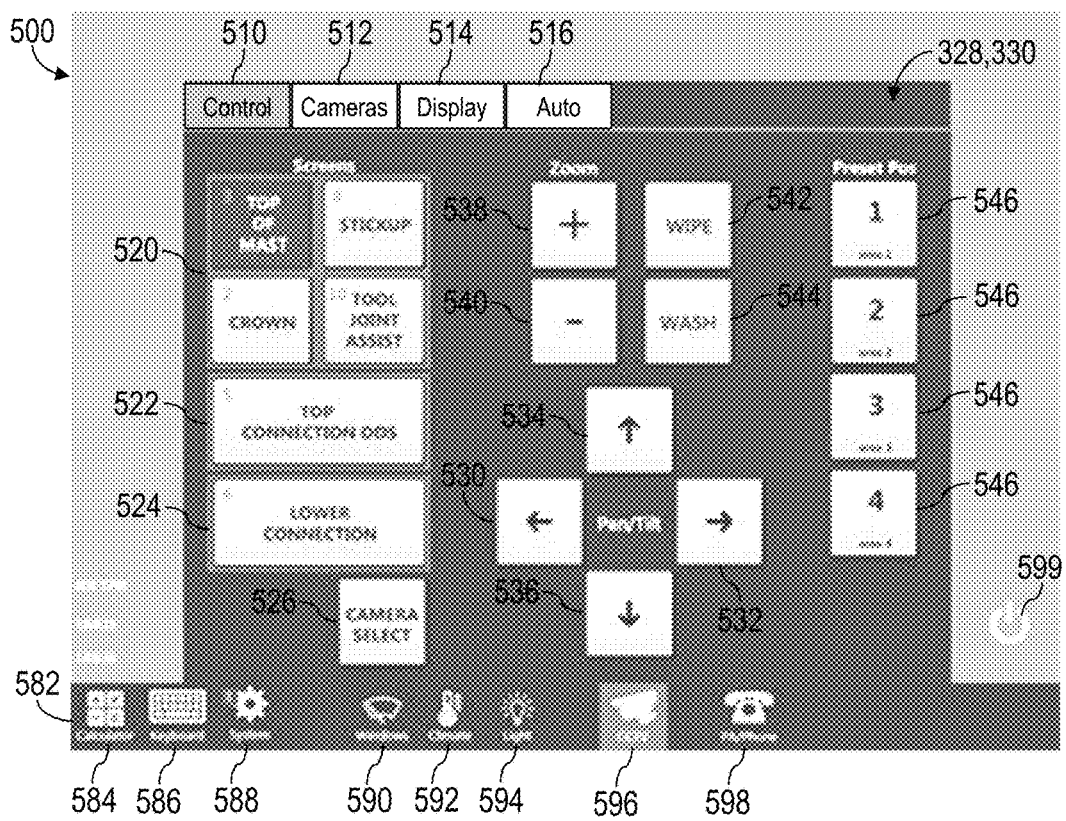
FIG. 8 is a schematic view of at least a portion of an example implementation of apparatus according to one or more aspects of the present disclosure.
Figure 9:
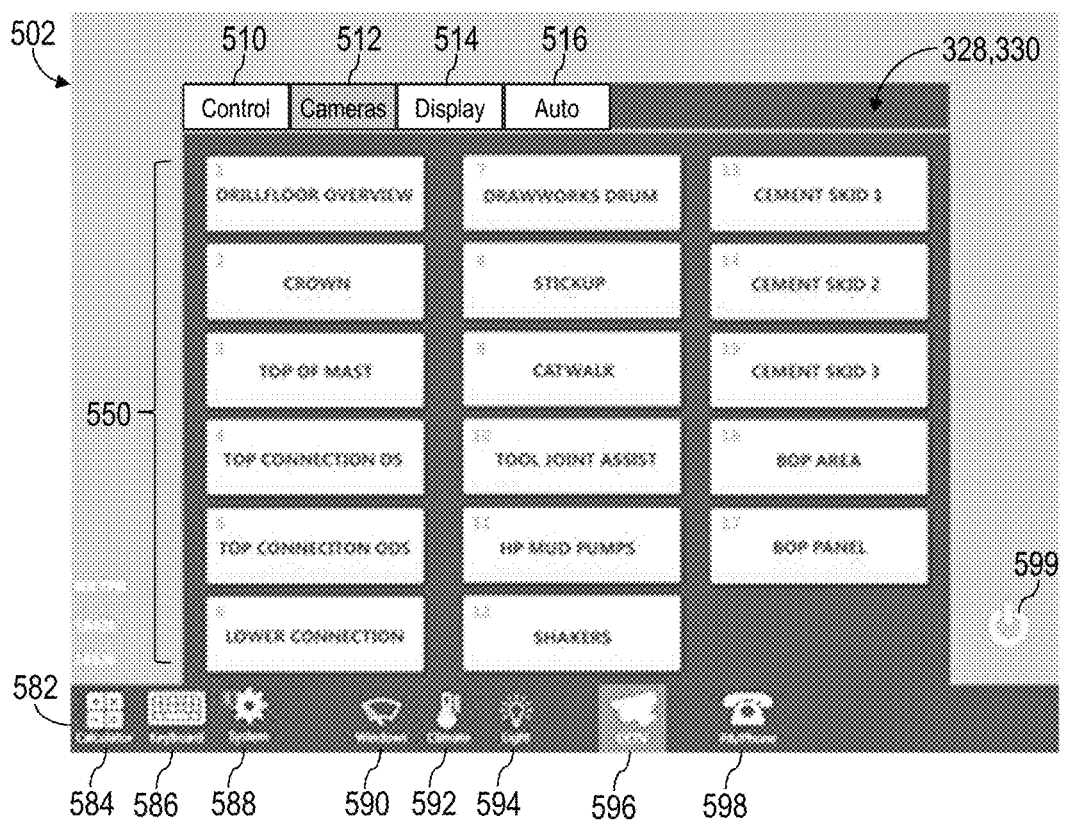
FIG. 9 is a schematic view of at least a portion of an example implementation of apparatus according to one or more aspects of the present disclosure.
Figure 10:
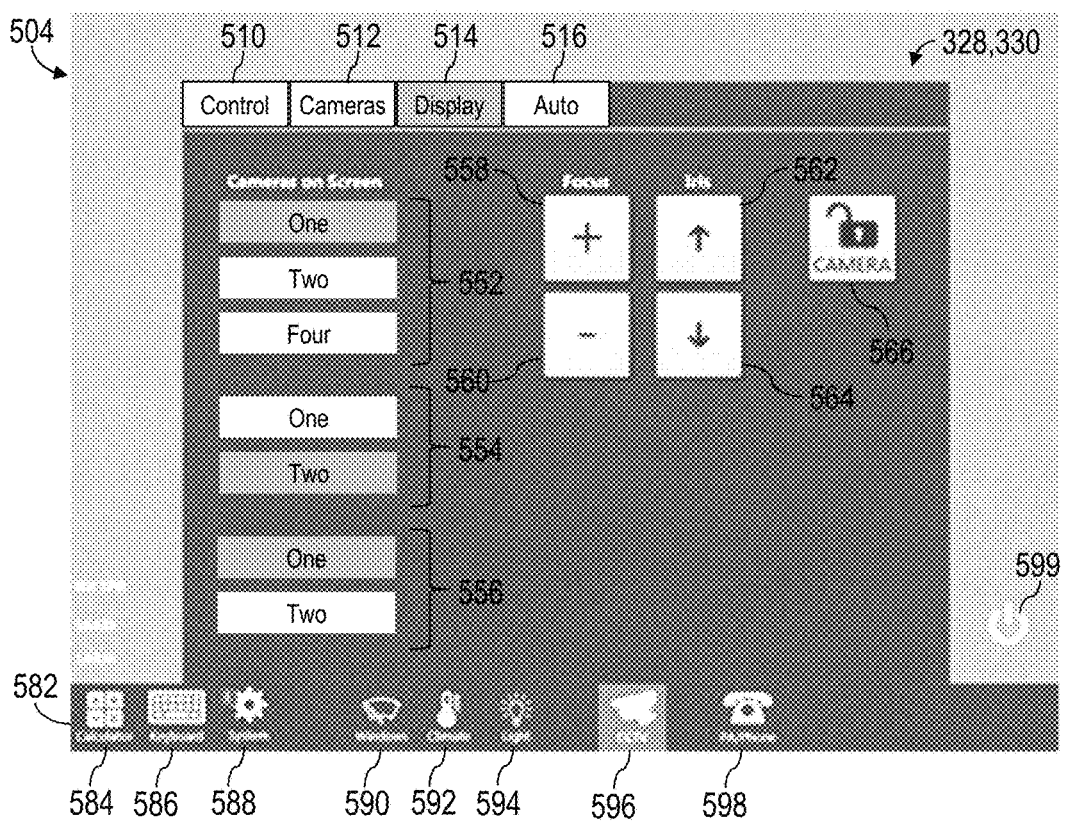
FIG. 10 is a schematic view of at least a portion of an example implementation of apparatus according to one or more aspects of the present disclosure.

The CCTV system 215 may instead be configured to display four video signals from four corresponding video cameras 198 (i.e., a quad-view video signal feed) with each video signal filling a corresponding quarter of the display screen of the video output device 332. For example, the CCTV configuration screen 500 shown in FIG. 8 depicts a quad-view video signal feed, such that the indicator button 520 is divided in four sections each indicating the video camera 198 providing the video feed displayed in the corresponding quarter. The indicator button 520 shows that the video output device 332 is configured to display four video signals from four corresponding video cameras 198 capturing real-time video of the top of the mast, the stickup, the crown, and the tool joint assist.

The CCTV configuration screen 500 may also be utilized to set position or direction (e.g., pan, tilt) of each video camera 198 of the CCTV system. For example, the screen 500 may include a video camera select button 526 for selecting the video cameras 198 to be repositioned. When the button 526 is operated, a list or a selection menu (not shown) may drop down or otherwise appear, permitting the wellsite operator 195 to select the video camera 198 to be configured. However, instead of the list or selection menu appearing, when the button 526 is operated, another screen may appear (e.g., screen 502 described below), permitting the wellsite operator 195 to select the video camera 198 to be configured. After the wellsite operator 195 selects a video camera 198, the video camera 198 may be panned left via button 530, panned right via button 532, tilted up via button 534, tilted down via button 536, zoomed in via button 538, and zoomed out via button 540. Additional buttons 542, 544 may be operated to wipe and wash, respectively, the selected video camera 198. Several positions for each video camera 198 may be stored or recalled by touching, clicking, or otherwise selecting a corresponding one of camera preset position buttons 546. For example, when the position of a selected video camera 198 is configured, one of the buttons 546 may be operated to save the current video camera settings. The same video camera 198 may be repositioned and the configuration saved by pressing another one of the buttons 546. Each preset position may be recalled by pressing one of the buttons 546 associated with the preset position. The wellsite operator 195 may also control the CCTV video cameras 198 using one or both of the joysticks 310, 312.

One or more of the CCTV configuration display screens 500, 502, 504, 506 may also be utilized by the wellsite operator 195 to manually select which of the video camera video signals are to be displayed on one or more of the video output devices 326. For example, the wellsite operator 195 may select the tab 512 to switch to the screen 502, shown in FIG. 9. The screen 502 displays video camera selection buttons 550 that may be operated to select one or more of the video cameras 198 whose video signals are to be displayed. Each button 550 may be labeled with the location of the corresponding video camera 198 or with the name of the wellsite equipment or portion of the well construction system 100 captured by the corresponding video camera 198. The buttons 550 may also or instead be labeled with other identifiers, such as equipment identification numbers. After being selected, one or more of the video output devices 326 may display the video signals from the one or more of the selected video cameras 198. Manual video camera selection may override the programmed associations described herein to display the video signals from the video cameras 198 manually selected. Instead of the screen 502 containing the buttons 550, the screen 502 may contain a list, a selection menu, or other means for manually selecting the video camera video signals to be displayed.

One or more of the CCTV configuration display screens 500, 502, 504, 506 may also be utilized by the wellsite operator 195 to select how many of the video camera video signals are to be displayed on each of the video output devices 326. For example, the wellsite operator 195 may select the tab 514 to switch to the screen 504, shown in FIG. 10. The screen 504 displays selection buttons 552, 554, 556 that may be operated to select the number of video camera video signals to be displayed on each of the video output devices 326. The button 552 may be operated to select the number of video camera video signals to be displayed on the video output device 332. The button 554 may be operated to select the number of video camera video signals to be displayed within corresponding PIP video windows 344, 422 on the video output device 334. The button 556 may be operated to select the number of video camera video signals to be displayed within corresponding PIP video windows 344, 422 on the video output device 336. The selected ones of the buttons 552, 554, 556 may be highlighted, differently colored, or otherwise distinguished from the non-selected ones of the buttons 552, 554, 556.

The screen 504 shows that the video output device 332 is set to display one video camera video signal, resulting in one video camera video signal displayed on the video output device 332, as shown in FIG. 4. The screen 504 further shows that the video output device 334 is set to display two video camera video signals, resulting in two video camera video signals displayed within corresponding PIP video windows 344, 422 on the video output device 334, as shown in FIG. 4. The screen 504 also shows that the video output device 336 is set to display one video camera video signal, resulting in one video camera video signal displayed within a corresponding PIP video window 344, 422 on the video output device 336, as shown in FIG. 4.

The screen 504 may also include manual focus adjustment control buttons 558, 560 operable to adjust optical focus of each selected video camera 198 and manual iris (i.e., aperture) adjustment control buttons 562, 564 operable to adjust iris size of each selected video camera 198 to match changing light conditions at the wellsite. The screen 504 may also include a video camera lock button 566 operable to lock video camera settings and/or controls, such as to prevent other wellsite operators 195 from configuring or otherwise controlling the locked video cameras 198.

One or more of the CCTV configuration display screens 500, 502, 504, 506 may also be utilized by the wellsite operator 195 to enter the above-described associations into the processing device 192. These may cause the CCTV system 215 to automatically display predetermined wellsite equipment and/or portions of the well construction system 100 during corresponding stages of the well construction operation and/or operational events detected during the well construction operation.

Figure 11:
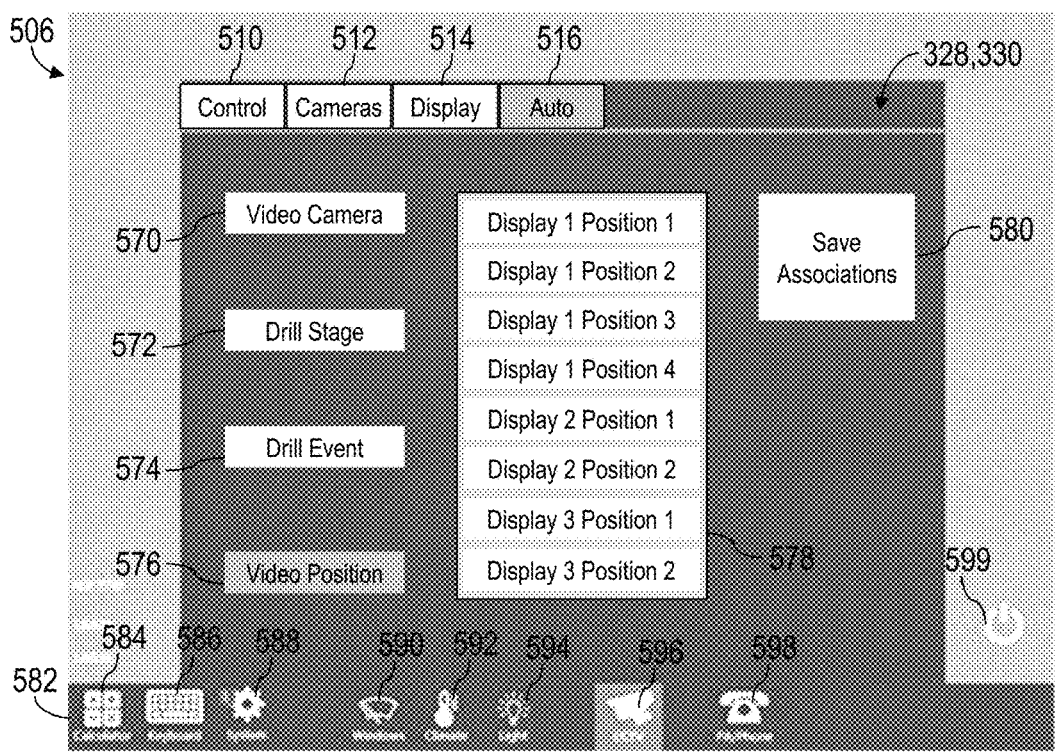
FIG. 11 is a schematic view of at least a portion of an example implementation of apparatus according to one or more aspects of the present disclosure.

To enter such associations, the wellsite operator 195 may select the tab 516 to switch to the CCTV configuration screen 506, shown in FIG. 11. The screen 506 displays software controls 328, 330 (e.g., buttons) that may be operated to select and, thus, associate the video cameras 198, the video output devices 326, and the various operational stages and/or events taking place during the well construction operation. A video camera selection button 570 may be operated by the wellsite operator 195 to select one of the video cameras 198 from which the video signal is to be displayed on one of the video output devices 326. When the button 570 is operated, a list or a selection menu (not shown) containing names or other identifiers of the video cameras 198 may drop down or otherwise appear, permitting the wellsite operator 195 to select a video camera 198. Thereafter, a drill stage selection button 572 may be operated by the wellsite operator 195 to select the operational stage of the well construction operation during which the video signal from the selected one of the video cameras 198 is to be displayed on one of the video output devices 326. When the button 572 is operated, a list or a selection menu (not shown) containing names or other identifiers of the operational stages may drop down or otherwise appear, permitting the wellsite operator 195 to select and, thus, associate the operational stage with the previously selected video camera 198.

Instead of or in addition to selecting the operational stage, a drill event selection button 574 may be operated by the wellsite operator 195 to select the operational event during which the video signal from the selected one of the video cameras 198 is to be displayed on one of the video output devices 326. When the button 574 is operated, a list or a selection menu (not shown) containing names or other identifiers of the operational events may drop down or otherwise appear, permitting the wellsite operator 195 to select and, thus, associate the operational event with the previously selected video camera 198.

A video position selection button 576 may also be operated by the wellsite operator 195 to select which of the video output devices 326 will display the selected video signal and the position (i.e., location) on the selected video output device 326 that the selected video signal will be displayed. When the button 576 is operated, a list or a selection menu 578 containing names or other identifiers of the video output devices 326 and available positions (e.g., quadrant of the video output device 332, PIP windows 344, 422 of the video output devices 334, 336, etc.) for the video signal from the selected video camera 198 to be displayed may drop down or otherwise appear, permitting the wellsite operator 195 to select and, thus, associate the video signal with one of the video output devices 326 and the display position on such video output device 326. After the associations between the video cameras 198, the video output devices 326, and the operational stages and/or events are selected, the associations may be saved to the processing device 192 by operating a save button 580 displayed on the screen 506.

In addition to displaying the CCTV configuration display screens 500, 502, 504, 506, the processing device 192 may be further operable to provide other software tools operable to display configuration display screens on one or more of the video output devices 322, 324, 326, such as for configuring other systems or portions of the well construction system 100. For example, the touchscreens 322, 324 may display a tool selection bar 582 displaying icons, buttons, or other software controls permitting the wellsite operator 195 to select and use other software tools from the operator chair 304 via finger contact with the touchscreens 322, 324. The tool selection bar 582 may be permanently displayed on one or both of the touchscreens 322, 324, such as may permit the wellsite operator 195 to quickly switch between different software tools.

The software tools may each have multiple, independently selectable configuration screens (i.e., pages), each corresponding to an activity, operation, and/or types/categories thereof. As shown on the example configurations screens 500, 502, 504, 506 depicted in FIGS. 7-11, the tool selection bar 582 may include a calculator tool icon 584 for displaying a calculator, a keyboard tool icon 586 for displaying a keyboard, and a display configuration tool icon 588 for displaying a software control display preference screen. The tool selection bar 582 may further include a cabin windows control tool icon 590 for displaying a cabin window control screen, a cabin climate control tool icon 592 for displaying a cabin climate control screen, a control cabin lighting control tool icon 594 for displaying a cabin lighting control screen, and a PA/phone tool icon 598 for displaying an internet-based phone control screen. The tool selection bar 582 may also include a CCTV configuration tool icon 596 operable to display the CCTV configuration screens 500, 502, 504, 506 described above. As shown in FIG. 11, the selected icon may be highlighted, differently colored, or otherwise distinguished from the non-selected icons, such as to inform the wellsite operator 195 which software tool is currently being displayed. Each configuration screen generated on the touchscreens 322, 324 may also include a power button 599 operable to turn off the corresponding touchscreen 322, 324 when selected. The software tools and corresponding icons described above are merely examples, and additional and/or different software tools and corresponding icons are also within the scope of the present disclosure.

Figure 12:
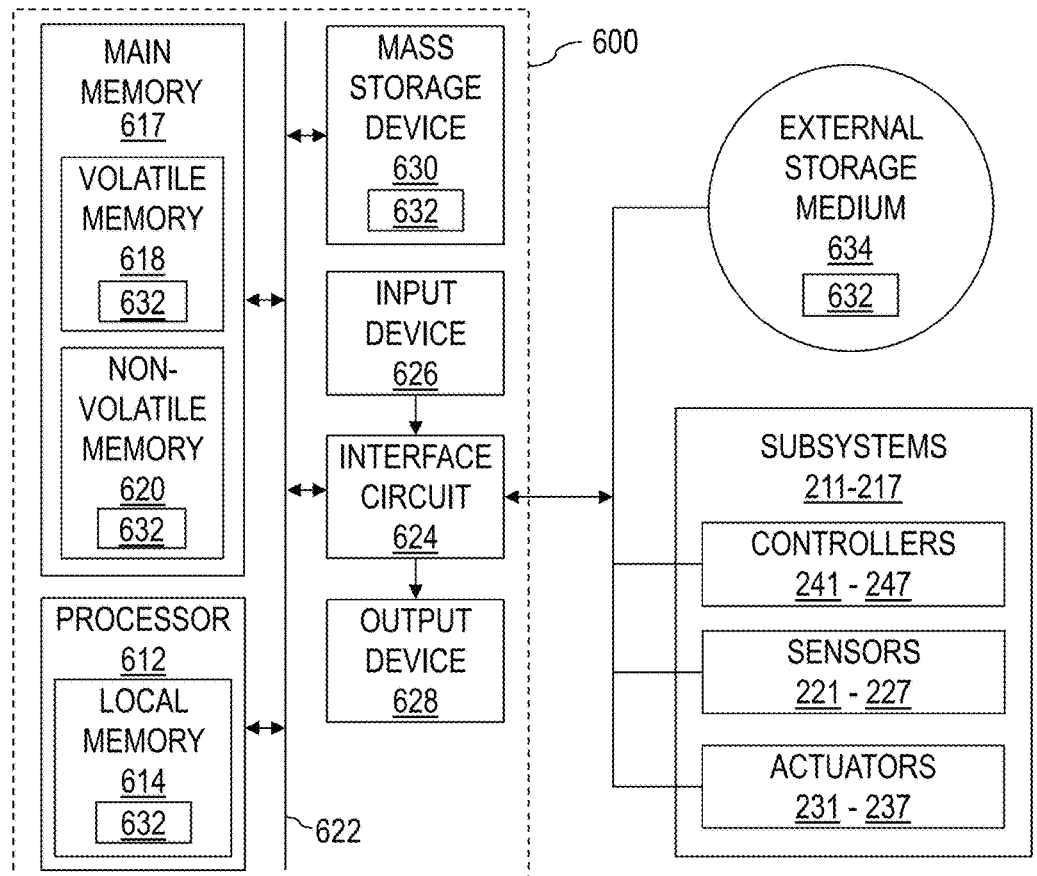
FIG. 12 is a schematic view of at least a portion of an example implementation of apparatus according to one or more aspects of the present disclosure.

FIG. 12 is a schematic view of at least a portion of an example implementation of a processing device 600 according to one or more aspects of the present disclosure. Implementations of the processing device 600 may form at least a portion of one or more electronic devices utilized at the well construction system 100. For example, an implementation of the processing device 600 may be or form at least a portion of the processing devices 188, 192. Implementations of the processing device 600 may form at least a portion of the control system 200, including the wellsite computing resource environment 205, the coordinated control device 204, the supervisory control system 207, the local controllers 241-247, the onsite user devices 219, and the offsite user devices 220. The wellsite computing resource environment 205, the coordinated control device 204, the supervisory control system 207, one or more of the local controllers 241-247, one or more of the onsite user devices 219, and/or one or more of the offsite user devices 220 may also be or comprise an implementation of the processing device 600.

When implemented as part of the wellsite computing resource environment 205, the processing device 600 may be in communication with various sensors, actuators, controllers, and other devices of the subsystems 211-217 of the well construction system 100. The processing device 600 may be operable to receive coded instructions 632 from the wellsite operators 195 and the sensor data 251-257 generated by the sensors 221-227, process the coded instructions 632 and the sensor data 251-257, and communicate the control data 261-267 to the local controllers 241-247 and/or the actuators 231-237 to execute the coded instructions 632 to implement at least a portion of one or more example methods and/or operations described herein, and/or to implement at least a portion of one or more of the example systems described herein.

The processing device 600 may be or comprise, for example, one or more processors, special-purpose computing devices, servers, personal computers (e.g., desktop, laptop, and/or tablet computers), personal digital assistants, smartphones, internet appliances, and/or other types of computing devices. The processing device 600 may comprise a processor 612, such as a general-purpose programmable processor. The processor 612 may comprise a local memory 614, and may execute coded instructions 632 present in the local memory 614 and/or another memory device. The processor 612 may execute, among other things, the machine-readable coded instructions 632 and/or other instructions and/or programs to implement the example methods and/or operations described herein. The programs stored in the local memory 614 may include program instructions or computer program code that, when executed by the processor 612 of the processing device 600, may cause the subsystems 211-217 of the well construction system 100 to perform the example methods and/or operations described herein. The processor 612 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Other processors from other families may also be utilized.

The processor 612 may be in communication with a main memory 617, such as may include a volatile memory 618 and a non-volatile memory 620, perhaps via a bus 622 and/or other communication means. The volatile memory 618 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 620 may be, comprise, or be implemented by read-only memory, flash memory, and/or other types of memory devices. One or more memory controllers (not shown) may control access to the volatile memory 618 and/or non-volatile memory 620.

The processing device 600 may also comprise an interface circuit 624. The interface circuit 624 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 624 may also comprise a graphics driver card. The interface circuit 624 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the local controllers 241-247, the sensors 221-227, and the actuators 231-237 may be connected with the processing device 600 via the interface circuit 624, such as may facilitate communication between the processing device 600 and the local controllers 241-247, the sensors 221-227, and/or the actuators 231-237.

One or more input devices 626 may also be connected to the interface circuit 624. The input devices 626 may permit the wellsite operators 195 to enter the coded instructions 632, such as control commands, processing routines, operational set-points, and/or video display settings, including associations between the video cameras 198, the video output devices 326, and the various operational stages and/or events taking place during the well construction operation. The input devices 626 may be, comprise, or be implemented by a keyboard, a mouse, a joystick, a touchscreen, a track-pad, a trackball, an isopoint, and/or a voice recognition system, among other examples. One or more output devices 628 may also be connected to the interface circuit 624. The output devices 628 may be, comprise, or be implemented by video output devices (e.g., an LCD, an LED display, a CRT display, and/or a touchscreen), printers, and/or speakers, among other examples. The processing device 600 may also communicate with one or more mass storage devices 630 and/or a removable storage medium 634, such as may be or include floppy disk drives, hard drive disks, compact disk (CD) drives, digital versatile disk (DVD) drives, and/or USB and/or other flash drives, among other examples.

The coded instructions 632 may be stored in the mass storage device 630, the main memory 617, the local memory 614, and/or the removable storage medium 634. Thus, the processing device 600 may be implemented in accordance with hardware (perhaps implemented in one or more chips including an integrated circuit, such as an ASIC), or may be implemented as software or firmware for execution by the processor 612. In the case of firmware or software, the implementation may be provided as a computer program product including a non-transitory, computer-readable medium or storage structure embodying computer program code (i.e., software or firmware) thereon for execution by the processor 612. The coded instructions 632 may include program instructions or computer program code that, when executed by the processor 612, may cause the various subsystems 211-217 of the well construction system 100 to perform intended methods, processes, and/or operations disclosed herein.

In view of the entirety of the present disclosure, including the figures and the claims, a person having ordinary skill in the art will readily recognize that the present disclosure introduces an apparatus comprising: (A) a closed-circuit television (CCTV) system for use at a well construction system operable to form a well at an oil/gas wellsite, wherein the CCTV system comprises: (1) a plurality of video cameras at different locations within the well construction system, wherein each video camera is operable to generate a corresponding video signal; and (2) a video output device; and (B) a control system communicatively connected with each of the video cameras and the video output device, wherein the control system comprises a processor and a memory operable to store computer programs, wherein the computer programs utilize video display settings, and wherein the control system is operable to: (1) receive the video display settings from a human wellsite operator; (2) receive the video signals from each of the video cameras; and (3) automatically display on the video output device one or more of the received video signals based on the video display settings.

The video display settings may comprise associations between: each successive operational stage of a well construction operation during which the well construction system forms the wellbore; and one or more of the video cameras capturing one or more portions of the well construction system performing such operational stage of the well construction operation. In such implementations, among others within the scope of the present disclosure, the control system may be operable (during the well construction operation) to automatically display on the video output device one or more of the video signals from the one or more of the video cameras associated with each successive operational stage of the well construction operation, thereby automatically showing one or more portions of the well construction system performing each successive operational stage of the well construction operation.

The control system may be operable to: receive sensor information from a sensor of the well construction system; detect an operational event occurring in the well construction system based on the received sensor information, wherein the video display settings may comprise an association between the operational event and one of the video cameras capturing a portion of the well construction system experiencing that operational event; and, upon detecting the operational event, automatically display on the video output device the video signal from the associated video camera, thereby automatically showing the well construction system portion experiencing the detected operational event.

The control system may be operable to: (A) receive sensor information from a plurality of sensors of the well construction system; (B) detect operational events occurring in the well construction system based on the received sensor information, wherein the video display settings may comprise associations between: (1) each operational event; and (2) one of the video cameras capturing a portion of the well construction system experiencing that operational event; and (C) upon detecting one of the operational events, automatically display on the video output device the video signal from the video camera associated with the detected operational event, thereby automatically showing the well construction system portion experiencing the detected operational event.

The video display settings may comprise one or more of video camera zoom, video camera pan, and video camera tilt.

The control system may be operable to: receive sensor information from a plurality of sensors of the well construction system; and display on the video output device the received sensor information, wherein the one or more of the received video signals may be automatically displayed in a picture-in-picture video window on the video output device based on the received video display settings.

The video output device may be a first video output device, the CCTV system may comprise a second video output device adjacent the first video output device, a first one of the video signals may be automatically displayed on the first video output device based on the received video display settings, and the control system may be operable to: receive sensor information from a plurality of sensors of the well construction system; display the received sensor information on the second video output device; and automatically display a second one of the video signals in a picture-in-picture video window on the second video output device based on the received video display settings.

The video output device may be a first video output device, and the apparatus may comprise a second video output device communicatively connected with the control system and operable to display a screen comprising a plurality of software controls operable by the human wellsite operator to enter the video display settings to the control system. The second video output device may be a touch screen permitting the human wellsite operator to operate the software controls via finger contact with the touch screen. The apparatus may comprise an operator control workstation having a seat from which the wellsite human operator controls the well construction system, and the operator control workstation may comprise the second video output device disposed in association with the seat, thereby permitting the wellsite human operator to operate the software controls via finger contact from the seat. The software controls may comprise: a video camera selection button operable to select each of the video cameras to be configured for operation; and one or more of a video camera zoom button, a video camera pan button, and a video camera tilt button. The video camera selection button may be one of a plurality of video camera selection buttons each associated with a different one of the video cameras, and each of the video camera selection buttons may be labeled with a location of the associated one of the video cameras or with names of wellsite equipment of the well construction system captured by the associated one of the video cameras. The first video output device may be a first one of a plurality of first video output devices, and one or more of the software controls may be operable to associate one or more of the video cameras with one or more of the first video output devices such that the one or more of the first video output devices display one or more of the video signals from the associated one or more of the video cameras. One of the software controls may be operable to associate each first video output device with one of the video cameras such that each first video output device displays the video signal from the associated video camera. The software controls may comprise a video camera selection button operable to override the received video display settings to select a different one of the video cameras whose video signal is to be displayed on the/each first video output device.

The present disclosure also introduces an apparatus comprising a well construction system comprising: (A) a plurality of components collectively operable to construct a well at an oil/gas wellsite via a plurality of operations; (B) a plurality of video cameras each positioned at a different location in the well construction system and operable to generate a corresponding video signal; (C) a video output device; and (D) a control system comprising a processor and a memory storing an executable code, wherein the control system is operable to: (1) receive the video signals from the video cameras; (2) receive video display settings comprising associations between the operations and the video cameras; and (3) during each operation, automatically display on the video output device one or more of the video signals received from the one or more video cameras associated with that operation.

During each operation, the automatic display of the one or more of the video signals received from the one or more video cameras associated with that operation may automatically show one or more portions of the well construction system performing that operation, and/or one or more of the components associated with that operation.

The control system may be operable to: receive sensor information from a sensor of the well construction system; detect an operational event occurring in the well construction system based on the received sensor information, wherein the video display settings may comprise an association between the operational event and one of the video cameras capturing a portion of the well construction system experiencing that operational event; and, upon detecting the operational event, automatically display on the video output device the video signal from the associated video camera, thereby automatically showing the well construction system portion experiencing the detected operational event.

The control system may be operable to: (A) receive sensor information from a plurality of sensors of the well construction system; (B) detect operational events occurring in the well construction system based on the received sensor information, wherein the video display settings may comprise associations between: (1) each operational event; and (2) one of the video cameras capturing a portion of the well construction system experiencing that operational event; and (C) upon detecting one of the operational events, automatically display on the video output device the video signal from the video camera associated with the detected operational event, thereby automatically showing the well construction system portion experiencing the detected operational event.

The video display settings may comprise one or more of video camera zoom, video camera pan, and video camera tilt.

The control system may be operable to: receive sensor information from a plurality of sensors of the well construction system; and display on the video output device the received sensor information, wherein the one or more of the received video signals is automatically displayed in a picture-in-picture video window on the video output device based on the received video display settings.

The video output device may be a first video output device, the well construction system may comprise a second video output device adjacent the first video output device, a first one of the video signals may be automatically displayed on the first video output device based on the received video display settings, and the control system may be operable to: receive sensor information from a plurality of sensors of the well construction system; display the received sensor information on the second video output device; and automatically display a second one of the video signals in a picture-in-picture video window on the second video output device based on the received video display settings.

The video output device may be a first video output device, and the apparatus may comprise a second video output device communicatively connected with the control system and operable to display a screen comprising a plurality of software controls operable by a human wellsite operator to enter the video display settings to the control system. The second video output device may be a touch screen permitting the human wellsite operator to operate the software controls via finger contact with the touch screen. The apparatus may comprise an operator control workstation having a seat from which the wellsite human operator controls the well construction system, and the operator control workstation may comprise the second video output device disposed in association with the seat to permit the wellsite human operator to operate the software controls via finger contact from the seat. The software controls may comprise: a video camera selection button operable to select each of the video cameras to be configured for operation; and one or more of a video camera zoom button, a video camera pan button, and a video camera tilt button. The video camera selection button may be one of a plurality of video camera selection buttons each associated with a different one of the video cameras, and each of the video camera selection buttons may be labeled with a location of the associated one of the video cameras or with names of wellsite equipment of the well construction system captured by the associated one of the video cameras. The first video output device may be a first one of a plurality of first video output devices, and one or more of the software controls are operable to associate one or more of the video cameras with one or more of the first video output devices such that the one or more of the first video output devices display one or more of the video signals from the associated one or more of the video cameras. One of the software controls may be operable to associate each first video output device with one of the video cameras such that each first video output device displays the video signal from the associated video camera. The software controls may comprise a video camera selection button operable to override the received video display settings to select a different one of the video cameras whose video signal is to be displayed on the/each first video output device.

The present disclosure also introduces a method comprising constructing a well at an oil/gas wellsite by: (A) operating a well construction system to perform a plurality of operations; and (B) operating a control system comprising a processor and a memory storing an executable code, wherein operating the control system comprises: (1) receiving video signals from video cameras each positioned at a different location in the well construction system; and (2) receiving video display settings comprising associations between the operations and the video cameras such that, during each operation, a video output device automatically displays one or more of the video signals received from the one or more video cameras associated with that operation.

During each operation, the automatic display of the one or more of the video signals received from the one or more video cameras associated with that operation may automatically show one or more portions of the well construction system performing that operation.

Operating the well construction system to perform the operations may comprise operating the control system to operate a plurality of components of the well construction system to perform the operations. During each operation, the automatic display of the one or more of the video signals received from the one or more video cameras associated with that operation may automatically show one or more of the components associated with that operation.

The video display settings may comprise associations between operational events and the video cameras, and operating the control system may comprise: receiving sensor information generated by a plurality of sensors of the well construction system; detecting occurrence of one of the operational events based on the sensor information; and upon detecting the operational event, automatically displaying on the video output device one or more video signals from one or more of the video cameras associated with the detected operational event. Automatically displaying the one or more video signals from the one or more video cameras associated with the detected operational event may automatically show one or more portions of the well construction system experiencing the detected operational event.

The video display settings may comprise one or more of video camera zoom, video camera pan, and video camera tilt.

The video output device may be a first video output device, the apparatus may comprise a second video output device, and operating the control system may comprise: displaying on the second video output device a screen comprising a plurality of software buttons; and operating the software buttons by a human wellsite operator to enter the video display settings into the control system. Operating the software buttons by the human wellsite operator may comprise operating the software buttons to: select one or more of the video cameras to be configured for operation; and adjust one or more of a video camera zoom, video camera pan, and a video camera tilt of the selected one or more of the video cameras.

Operating the control system may comprise: receiving sensor information from a plurality of sensors of the well construction system; and displaying the received sensor information on the video output device, wherein the one or more of the received video signals may be automatically displayed in a picture-in-picture video window on the video output device based on the received video display settings.

The video output device may be a first video output device, a first one of the video signals may be automatically displayed on the first video output device based on the received video display settings, and operating the control system may comprise: receiving sensor information from a plurality of sensors of the well construction system; displaying the received sensor information on a second video output device; and automatically displaying a second one of the video signals on the second video output device based on the received video display settings in a picture-in-picture video window.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
a closed-circuit television (CCTV) system for use at a well construction system operable to form a well at an oil/gas wellsite, wherein the CCTV system comprises:
a plurality of video cameras at different locations within the well construction system, wherein each video camera is operable to generate a corresponding video signal; and
a video output device; and
a control system communicatively connected with each of the video cameras and the video output device, wherein the control system comprises a processor and a memory operable to store computer programs, wherein the computer programs utilize video display settings, and wherein the control system is operable to:
receive the video display settings from a human wellsite operator;
receive the video signals from each of the video cameras; and
automatically display on the video output device one or more of the received video signals based on the video display settings,
wherein the video display settings comprise associations between:
each successive operational stage of a well construction operation during which the well construction system forms the wellbore; and
one or more of the video cameras capturing one or more portions of the well construction system performing such operational stage of the well construction operation; and
during the well construction operation, the control system is further operable to automatically display on the video output device one or more of the video signals from the one or more of the video cameras associated with each successive operational stage of the well construction operation to automatically show one or more portions of the well construction system performing each successive operational stage of the well construction operation.

2. An apparatus comprising:
a closed-circuit television (CCTV) system for use at a well construction system operable to form a well at an oil/gas wellsite, wherein the CCTV system comprises:
a plurality of video cameras at different locations within the well construction system, wherein each video camera is operable to generate a corresponding video signal; and
a video output device; and
a control system communicatively connected with each of the video cameras and the video output device, wherein the control system comprises a processor and a memory operable to store computer programs, wherein the computer programs utilize video display settings, and wherein the control system is operable to:
receive the video display settings from a human wellsite operator;
receive the video signals from each of the video cameras; and
automatically display on the video output device one or more of the received video signals based on the video display settings,
wherein the control system is further operable to:
receive sensor information from a sensor of the well construction system;
detect an operational event occurring in the well construction system based on the received sensor information, wherein the video display settings comprise an association between the operational event and one of the video cameras capturing a portion of the well construction system experiencing that operational event; and
upon detecting the operational event, automatically display on the video output device the video signal from the associated video camera to automatically show the well construction system portion experiencing the detected operational event.

3. An apparatus comprising:
a closed-circuit television (CCTV) system for use at a well construction system operable to form a well at an oil/gas wellsite, wherein the CCTV system comprises:
a plurality of video cameras at different locations within the well construction system, wherein each video camera is operable to generate a corresponding video signal; and
a video output device; and
a control system communicatively connected with each of the video cameras and the video output device, wherein the control system comprises a processor and a memory operable to store computer programs, wherein the computer programs utilize video display settings, and wherein the control system is operable to:
receive the video display settings from a human wellsite operator;
receive the video signals from each of the video cameras; and
automatically display on the video output device one or more of the received video signals based on the video display settings,
wherein the control system is further operable to:
receive sensor information from a plurality of sensors of the well construction system;
detect operational events occurring in the well construction system based on the received sensor information, wherein the video display settings comprise associations between:
each operational event; and
one of the video cameras capturing a portion of the well construction system experiencing that operational event; and
upon detecting one of the operational events, automatically display on the video output device the video signal from the video camera associated with the detected operational event to automatically show the well construction system portion experiencing the detected operational event.

4. An apparatus comprising:
a closed-circuit television (CCTV) system for use at a well construction system operable to form a well at an oil/gas wellsite, wherein the CCTV system comprises:
a plurality of video cameras at different locations within the well construction system, wherein each video camera is operable to generate a corresponding video signal; and
a video output device; and
a control system communicatively connected with each of the video cameras and the video output device, wherein the control system comprises a processor and a memory operable to store computer programs, wherein the computer programs utilize video display settings, and wherein the control system is operable to:
receive the video display settings from a human wellsite operator;
receive the video signals from each of the video cameras; and
automatically display on the video output device one or more of the received video signals based on the video display settings,
wherein the video output device is a first video output device, and wherein the apparatus further comprises a second video output device communicatively connected with the control system and operable to display a screen comprising a plurality of software controls operable by the human wellsite operator to enter the video display settings to the control system, and
the second video output device is a touch screen permitting the human wellsite operator to operate the software controls via finger contact with the touch screen.

5. The apparatus of claim 4 wherein the apparatus further comprises an operator control workstation having a seat from which the wellsite human operator controls the well construction system, and wherein the operator control workstation comprises the second video output device disposed in association with the seat to permit the wellsite human operator to operate the software controls via finger contact from the seat.

6. An apparatus comprising:
a closed-circuit television (CCTV) system for use at a well construction system operable to form a well at an oil/gas wellsite, wherein the CCTV system comprises:
a plurality of video cameras at different locations within the well construction system, wherein each video camera is operable to generate a corresponding video signal; and
a video output device; and
a control system communicatively connected with each of the video cameras and the video output device, wherein the control system comprises a processor and a memory operable to store computer programs, wherein the computer programs utilize video display settings, and wherein the control system is operable to:
receive the video display settings from a human wellsite operator;
receive the video signals from each of the video cameras; and
automatically display on the video output device one or more of the received video signals based on the video display settings,
wherein the video output device is a first video output device, and wherein the apparatus further comprises a second video output device communicatively connected with the control system and operable to display a screen comprising a plurality of software controls operable by the human wellsite operator to enter the video display settings to the control system, and
the software controls comprise:
a video camera selection button operable to select each of the video cameras to be configured for operation; and
one or more of a video camera zoom button, a video camera pan button, and a video camera tilt button.

7. An apparatus comprising:
a closed-circuit television (CCTV) system for use at a well construction system operable to form a well at an oil/gas wellsite, wherein the CCTV system comprises:
a plurality of video cameras at different locations within the well construction system, wherein each video camera is operable to generate a corresponding video signal; and
a video output device; and
a control system communicatively connected with each of the video cameras and the video output device, wherein the control system comprises a processor and a memory operable to store computer programs, wherein the computer programs utilize video display settings, and wherein the control system is operable to:
receive the video display settings from a human wellsite operator;
receive the video signals from each of the video cameras; and
automatically display on the video output device one or more of the received video signals based on the video display settings,
wherein the control system is further operable to:
receive sensor information from a plurality of sensors of the well construction system; and
display on the video output device the received sensor information, wherein the one or more of the received video signals is automatically displayed in a picture-in-picture video window on the video output device based on the received video display settings.

8. An apparatus comprising:
a closed-circuit television (CCTV) system for use at a well construction system operable to form a well at an oil/gas wellsite, wherein the CCTV system comprises:
a plurality of video cameras at different locations within the well construction system, wherein each video camera is operable to generate a corresponding video signal; and
a video output device; and
a control system communicatively connected with each of the video cameras and the video output device, wherein the control system comprises a processor and a memory operable to store computer programs, wherein the computer programs utilize video display settings, and wherein the control system is operable to:
receive the video display settings from a human wellsite operator;
receive the video signals from each of the video cameras; and
automatically display on the video output device one or more of the received video signals based on the video display settings, and
the video output device is a first video output device;
the CCTV system comprises a second video output device adjacent the first video output device;
a first one of the video signals is automatically displayed on the first video output device based on the received video display settings; and
the control system is further operable to:
receive sensor information from a plurality of sensors of the well construction system;
display the received sensor information on the second video output device; and
automatically display a second one of the video signals in a picture-in-picture video window on the second video output device based on the received video display settings.

9. An apparatus comprising:
a well construction system comprising:
a plurality of components collectively operable to construct a well at an oil/gas wellsite via a plurality of operations;
a plurality of video cameras each positioned at a different location in the well construction system and operable to generate a corresponding video signal;
a video output device; and
a control system comprising a processor and a memory storing an executable code, wherein the control system is operable to:
receive the video signals from the video cameras;
receive video display settings comprising associations between the operations and the video cameras; and
during each operation, automatically display on the video output device one or more of the video signals received from the one or more video cameras associated with that operation, and
the control system is further operable to:
receive sensor information from a sensor of the well construction system;
detect an operational event occurring in the well construction system based on the received sensor information, wherein the video display settings comprise an association between the operational event and one of the video cameras capturing a portion of the well construction system experiencing that operational event; and upon detecting the operational event, automatically display on the video output device the video signal from the associated video camera to automatically show the well construction system portion experiencing the detected operational event.

10. An apparatus comprising:

a well construction system comprising:
- a plurality of components collectively operable to construct a well at an oil/gas wellsite via a plurality of operations;
- a plurality of video cameras each positioned at a different location in the well construction system and operable to generate a corresponding video signal;
- a video output device; and
- a control system comprising a processor and a memory storing an executable code, wherein the control system is operable to:
  - receive the video signals from the video cameras;
  - receive video display settings comprising associations between the operations and the video cameras; and
  - during each operation, automatically display on the video output device one or more of the video signals received from the one or more video cameras associated with that operation, and the control system is further operable to:

receive sensor information from a plurality of sensors of the well construction system;

detect operational events occurring in the well construction system based on the received sensor information, wherein the video display settings comprise associations between:
- each operational event; and
- one of the video cameras capturing a portion of the well construction system experiencing that operational event; and upon detecting one of the operational events, automatically display on the video output device the video signal from the video camera associated with the detected operational event to automatically show the well construction system portion experiencing the detected operational event.

\* \* \* \* \*